United States Patent
Rice et al.

(10) Patent No.: US 7,148,890 B2
(45) Date of Patent: Dec. 12, 2006

(54) DISPLACEMENT MAPPING BY USING TWO PASSES THROUGH THE SAME RASTERIZER

(75) Inventors: Daniel S. Rice, Oakland, CA (US); Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 474 days.

(21) Appl. No.: 10/405,906

(22) Filed: Apr. 2, 2003

(65) Prior Publication Data

US 2004/0196285 A1    Oct. 7, 2004

(51) Int. Cl.
G06T 15/10    (2006.01)

(52) U.S. Cl. .................. 345/427; 345/419; 345/423

(58) Field of Classification Search ............... 345/423, 345/427
See application file for complete search history.

(56) References Cited

U.S. PATENT DOCUMENTS

| | | | | |
|---|---|---|---|---|
| 6,262,741 B1 * | 7/2001 | Davies | ............ | 345/423 |
| 6,326,964 B1 * | 12/2001 | Snyder et al. | ............ | 345/419 |
| 2002/0190988 A1 * | 12/2002 | Maillot et al. | ............ | 345/428 |

OTHER PUBLICATIONS

Gumhold, Stefan and Huttner, Tobias, Multiresolution Rendering with Displacement Mapping, Aug. 1999, Eurographics/SIGGRAPH Workshop on Graphics Hardware, pp. 55-66, 141.*
Lee et al., Displaced Subdivision Surfaces, 2000, Computer Graphics, Proc. of SIGGRAPH 2000, p. 85-94.*

* cited by examiner

Primary Examiner—Ulka Chauhan
Assistant Examiner—Said Broome
(74) Attorney, Agent, or Firm—Meyertons Hood Kivlin Kowert & Goetzel, P.C.; Jeffrey C. Hood

(57) ABSTRACT

A processing pipeline and method are disclosed that may enable real time video rate displacement mapping. The pipeline may include one or more: render units, texture units, memories, and displacement units. Render units may tessellate a geometric primitive into micropolygons and interpolate parameter values for each new vertex. The micropolygons may be defined by the intersection of the geometric primitive and boundaries projected from specified screen space regions. Texture units retrieve displacement values from a displacement map stored in memory. Displacement units displace each vertex of a micropolygon in the direction of the normal at each vertex by a distance based on the displacement value determined for the vertex location. Micropolygons that are displaced across a projected boundary may be returned to the render units and re-tessellated according to the projected boundaries. Parameter values for new vertices may be determined subject to an edge contract to prevent surface cracks.

35 Claims, 18 Drawing Sheets

```
┌─────────────────────────────────────────┐
│ Receive parameter values for two        │
│ vertices that define an edge of a       │
│ polygon where the parameter values to   │
│ be interpolated, including texture      │
│ coordinates and texture derivatives,    │
│ are explicitly specified for each       │
│ vertex location                         │
│ 500                                     │
└─────────────────────────────────────────┘
                    │
┌─────────────────────────────────────────┐
│ Select a first vertex and a second      │
│ vertex from the two vertices            │
│ 510                                     │
└─────────────────────────────────────────┘
                    │
┌─────────────────────────────────────────┐
│ Select one or more partitioning points  │
│ along the edge for new vertex locations │
│ 520                                     │
└─────────────────────────────────────────┘
                    │
┌─────────────────────────────────────────┐
│ Interpolate parameter values at each    │
│ new vertex location referenced to the   │
│ first vertex and using only the         │
│ parameter values for the two vertices   │
│ 530                                     │
└─────────────────────────────────────────┘
```

*FIG. 14*

Vertex A has minimum y for edge AB

DISPLACEMENT MAPPING BY USING TWO PASSES THROUGH THE SAME RASTERIZER

BACKGROUND OF THE INVENTION

1. Field of the Invention

This invention relates generally to the field of computer graphics and, more particularly, to a high performance graphics system which may enable video rate displacement mapping.

2. Description of the Related Art

Displacement mapping has been used in off-line applications to add fine geometric detail to a three-dimensional rendered object. It may be used in a similar manner to the more widely implemented "bump mapping," but provides more accurate silhouette edges and shadows.

Displacement mapping involves tessellating a three-dimensional model and determining a surface normal for each of a specified set of points. For each of these points a corresponding location in a displacement map may be determined and used to access a displacement value from a pre-computed, stored table. The table value is treated as a distance and the surface point may be displaced in the direction of the normal vector by a scalar multiple of the table value. Displacement mapping may be used to emboss a flat surface by modeling the flat surface and encoding the pattern to be embossed into a displacement map.

Pixar's Photo-realistic Renderman™ software product provides off-line displacement mapping.

SUMMARY

A processing pipeline and method are disclosed that may enable real time displacement mapping of micropolygons. The processing pipeline may include one or more render units, one or more texture units, one or more memories, and one or more displacement units. The number of units in each stage of the pipeline may be determined by the desired throughput and the average complexity of each task performed. In some embodiments, the processing pipeline may include two or more pipelines acting in parallel.

A host processor or computer may generate a stream of geometric primitives that represent graphic objects and may specify a normal and displacement map coordinates for each vertex of each primitive. The render units may sub-divide and/or tessellate a geometric primitive into multiple micropolygons and interpolate a normal for each new vertex based on the normal corresponding to each vertex of the geometric primitive. The micropolygons may be defined by the intersection of the geometric primitive and boundaries projected from specified screen space regions.

In some embodiments, a specified screen space region may be a region of screen space corresponding to a pixel, or a portion of a pixel. In other embodiments, a specified screen space region may be a region of screen space corresponding to a group of pixels, such as a 2×2 tile of 4 pixels. In still other embodiments, a specified screen space region may be a region of screen space corresponding to a group of pixels, such as an n×m array of pixels, where n and m are positive integers.

The amount a vertex is displaced may be based on a specified set of displacement values. The specified set of displacement values may be a displacement map stored in a memory. A texture unit may be used to retrieve displacement values from a displacement map. The displacement value selected for a vertex may be the value at a map location that is closest to the displacement map coordinates corresponding to the vertex, or the displacement value selected for a vertex may be interpolated from values for multiple map locations that surround the displacement map coordinates corresponding to the vertex. In some embodiments, the displacement map may contain vector displacement values, thereby specifying both a direction and a displacement value.

The displacement units may receive the micropolygon and an associated normal and displacement value for each vertex and displace each vertex of the micropolygon in the direction of the normal for the vertex (or in a specified direction) by an amount based on the displacement value for the vertex. If the displaced micropolygon maps into screen space and overlaps more than one adjacent specified screen space region, then the displacement unit may return the displaced micropolygon to the render unit to be subdivided into two or more new micropolygons so that each one of the sub-divided new micropolygons maps onto only one of the adjacent specified screen space regions. A displacement unit may tag a displaced micropolygon before returning the displaced micropolygon to the render unit so that the sub-divided new micropolygons may not be displaced a second time. The render units process the tagged micropolygons, interpolating a normal for each new vertex, and outputting the tagged micropolygons for further processing into sample values and/or pixel values.

In another set of embodiments, a first set of one or more render units may sub-divide and/or tessellate geometric primitives into micropolygons and interpolate a normal for each new vertex created. A second set of one or more render units may sub-divide those displaced micropolygons that map into screen space and overlap more than one adjacent specified screen space region. Each one of the sub-divided new micropolygons may then map onto only one of the adjacent specified screen space regions.

The method may also include outputting displaced micropolygons to a sample (or pixel) generation pipeline. The displacement of micropolygons may be processed at a rate to support a real-time video data stream.

In one set of embodiments, the system utilizes an edge contract to tessellate a graphics primitive. A render unit may be operable to receive parameter values for two vertices defining an edge of a polygon, where the parameter values for each of the two vertices comprise a normal, texture coordinates, and derivatives of vertex coordinates as a function of texture coordinates; and where each parameter value is determined specifically for the corresponding vertex. The render unit selects one of the two vertices defining the edge as a first vertex, where the selection is independent of the order the two vertices are received, and where the selection is independent of the one or more polygons containing the edge. The render unit may select one or more partitioning points along the edge from the first vertex; and interpolate parameter values for each of the partitioning points based on the location of the partitioning point and the parameter values and locations of the two vertices, where the interpolation algorithms are independent of the polygon containing the edge. The texture unit (or texture data access unit) may determine a texture value for each partitioning point by interpolation of texture values stored in a memory. A programmable processor (or programmable shader) may execute a program stored in a memory to operate on vertex parameter values based on texture values provided by the texture data access unit. In some of these embodiments, the programmable processor may be a displacement unit that may displace each of the new vertexes (also referred to as partitioning points) in an n-dimensional space based on the corresponding texture values, wherein n is greater than or equal to three.

BRIEF DESCRIPTION OF THE DRAWINGS

A better understanding of the present invention can be obtained when the following detailed description is considered in conjunction with the following drawings, in which:

FIG. 14 provides a flow chart for one set of embodiments of a method that utilizes an edge contract subdividing or tessellating a polygon;

Figure 1:
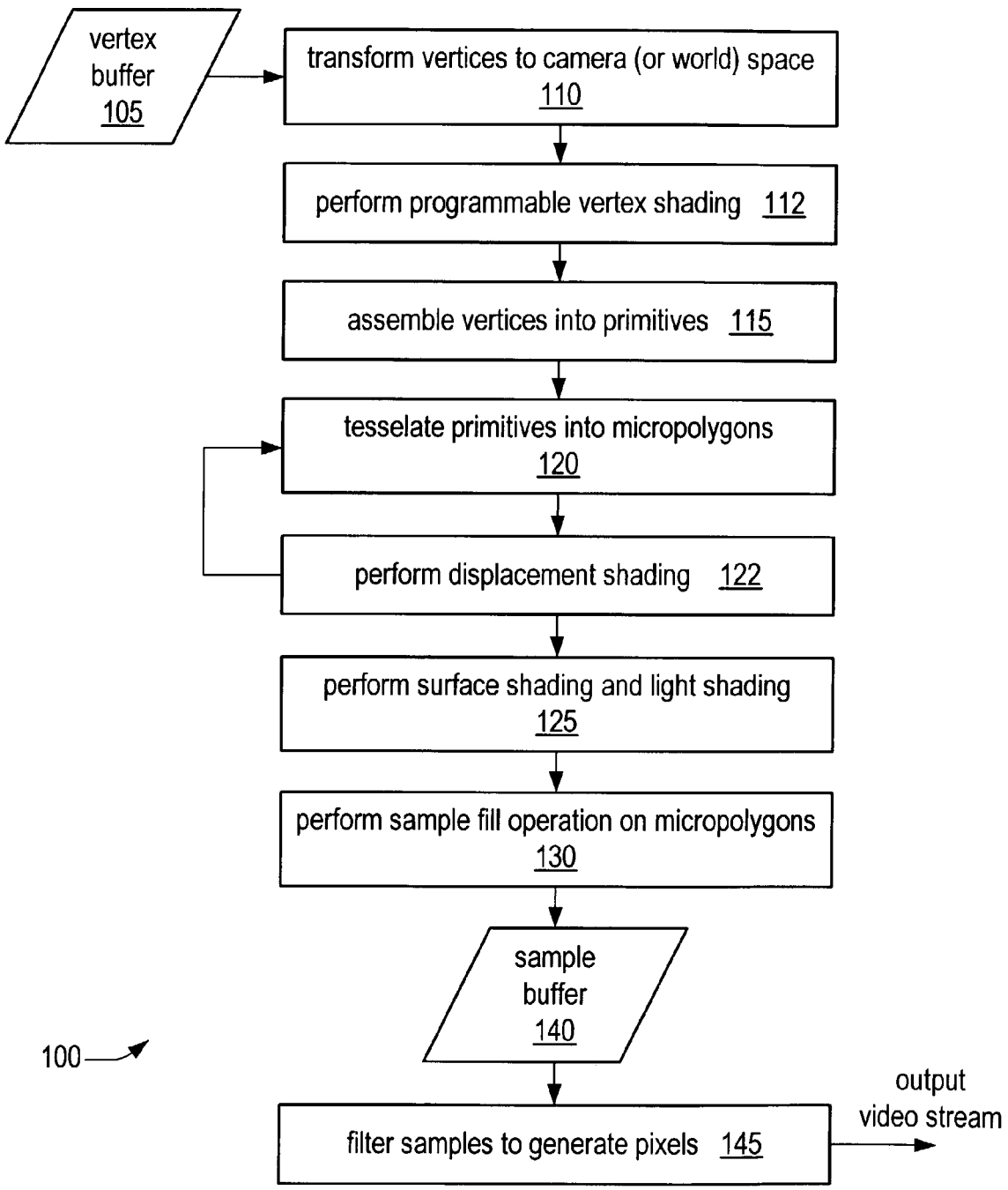
FIG. 1 illustrates one set of embodiments of a graphics rendering pipeline.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Various Spaces

The detailed description that follows may be more easily understood if various spaces are first defined:

Model Space: The space in which an object (or set of objects) is defined.

Virtual World Space: The space in which a scene comprising a collection of objects and light sources may be constructed. Each object may be injected into virtual world space with a transformation that achieves any desired combination of rotation, translation and scaling of the object. In older terminology, virtual world space has often been referred to simply as "world space".

Camera Space: A space defined by a transformation $T^{VC}$ from virtual world space. The transformation $T^{VC}$ may achieve a combination of translation, rotation, and scaling. The translation and rotation account for the current position and orientation of a virtual camera in the virtual world space. The coordinate axes of camera space are rigidly bound to the virtual camera. In OpenGL, camera space is referred to as "eye space".

Clipping Space: A space defined by a transform $T^{CX}$ from camera space before any perspective division by the W coordinate, and is used as an optimization in some clipping algorithms. In clipping space, the sides of the perspective-projection view volume may occur on the bounding planes $X=\pm W$, $Y=\pm W$, $Z=0$ and $Z=-W$. Clipping space is not mandated by the abstract rendering pipeline disclosed herein, and is defined here as a convenience for hardware implementations that choose to employ it.

Image Plate Space: A two-dimensional space with a normalized extent from −1 to 1 in each dimension, created after perspective division by the W coordinate of clipping space, but before any scaling and offsetting to convert coordinates into render pixel space).

Pixel Plate Space: A two-dimensional space created after perspective division by the W coordinate of camera space, but before any scaling and offsetting to convert coordinates into render pixel space.

Render Pixel Space: A space defined by a transform $T^{IR}$ from image plate space (or a transform $T^{JR}$ from pixel plate space). The transform $T^{IR}$ (or $T^{JR}$) scales and offsets points from image plate space (or pixel plate space) to the native space of the rendered samples. See FIGS. 7 and 8.

Video Pixel Space: According to the abstract rendering pipeline defined herein, a filtering engine generates virtual pixel positions in render pixel space (e.g., as suggested by the plus markers of FIG. 8), and may compute a video pixel at each of the virtual pixel positions by filtering samples in the neighborhood of the virtual pixel position. The horizontal displacement $\Delta x$ and vertical displacement $\Delta y$ between virtual pixel positions are dynamically programmable values. Thus, the array of virtual pixel positions is independent of the array of render pixels. The term "video pixel space" is used herein to refer to the space of the video pixels.

Texture Vertex Space: The space of the texture coordinates attached to vertices. Texture vertex space is related to texture image space by the currently active texture transform. (Effectively, every individual geometry object defines its own transform from texture vertex space to model space, by the association of the position, texture coordinates, and possibly texture coordinate derivatives with all the vertices that define the individual geometry object.)

Texture Image Space: This is a space defined by the currently active texture transform. It is the native space of texture map images.

Light Source Space: A space defined by a given light source.

Abstract Rendering Pipeline

FIG. 1 illustrates a rendering pipeline 100 that supports per-pixel programmable shading. The rendering pipeline 100 defines an abstract computational model for the generation of video pixels from primitives. Thus, a wide variety of hardware implementations of the rendering pipeline 100 are contemplated.

Vertex data packets may be accessed from a vertex buffer 105. A vertex data packet may include a position, a normal vector, texture coordinates, texture coordinate derivatives, and a color vector. More generally, the structure of a vertex data packet is user programmable. As used herein the term vector denotes an ordered collection of numbers.

In step 110, vertex positions and vertex normals may be transformed from model space to camera space or virtual world space. For example, the transformation from model space to camera space may be represented by the following expressions:

$$X^C = T^{MC} X^M,$$

$$N^C = G^{MC} n^M,$$

If the normal transformation $G^{MC}$ is not length preserving, the initial camera space vector $N^C$ may be normalized to unit length:

$$n^C = N^C / \text{length}(N^C).$$

For reasons that will become clear shortly, it is useful to maintain both camera space (or virtual world space) position and render pixel space position for vertices at least until after tessellation step 120 is complete. (This maintenance of vertex position data with respect to two different spaces is referred to herein as "dual bookkeeping".) Thus, the camera space position $X^C$ may be further transformed to render pixel space:

$$X^R = T^{CR} X^C.$$

The camera-space-to-render-pixel-space transformation $T^{CR}$ may be a composite transformation including transformations from camera space to clipping space, from clipping space to image plate space (or pixel plate space), and from image plate space (or pixel plate space) to render pixel space.

In step 112, one or more programmable vertex shaders may operate on the camera space (or virtual world space) vertices. The processing algorithm performed by each vertex shader may be programmed by a user. For example, a vertex shader may be programmed to perform a desired spatial transformation on the vertices of a set of objects.

In step 115, vertices may be assembled into primitives (e.g. polygons or curved surfaces) based on connectivity information associated with the vertices. Alternatively, vertices may be assembled into primitives prior to the transformation step 110 or programmable shading step 112.

In step 120, primitives may be tessellated into micropolygons. In one set of embodiments, a polygon may be declared to be a micropolygon if the projection of the polygon in render pixel space satisfies a maximum size constraint. The nature of the maximum size constraint may vary among hardware implementations. For example, in some implementations, a polygon qualifies as a micropolygon when each edge of the polygon's projection in render pixel space has length less than or equal to a length limit $L_{max}$ in render pixel space. The length limit $L_{max}$ may equal one or one-half. More generally, the length limit $L_{max}$ may equal a user-programmable value, e.g., a value in the range [0.5,2.0].

As used herein the term "tessellate" is meant to be a broad descriptive term for any process (or set of processes) that operates on a geometric primitive to generate micropolygons.

Figure 2A:
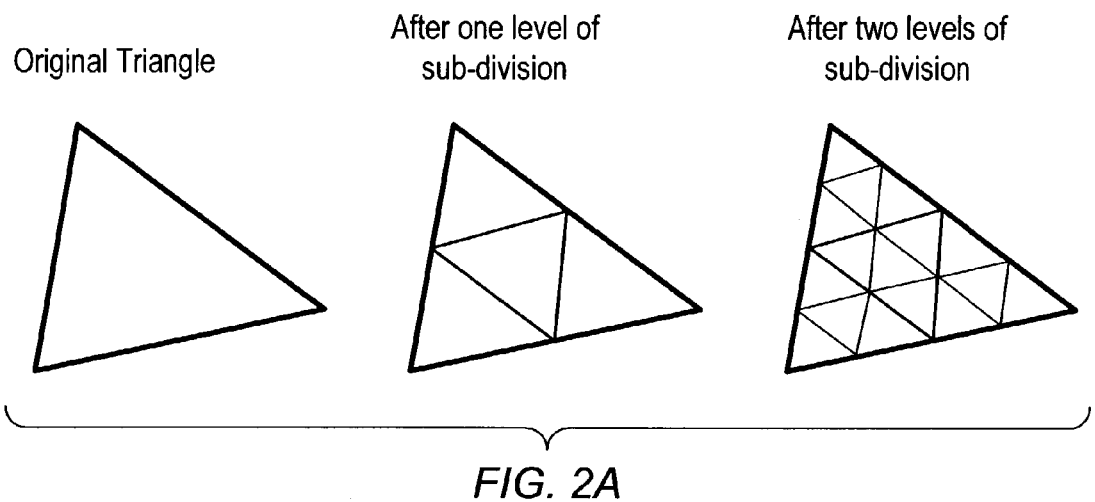
FIG. 2A illustrates one embodiment of a triangle fragmentation process.

Tessellation may include a triangle fragmentation process that divides a triangle into four subtriangles by injecting three new vertices, i.e., one new vertex at the midpoint of each edge of the triangle as suggested by FIG. 2A. The triangle fragmentation process may be applied recursively to each of the subtriangles. Other triangle fragmentation processes are contemplated. For example, a triangle may be subdivided into six subtriangles by means of three bisecting segments extending from each vertex of the triangle to the midpoint of the opposite edge.

Figure 2B:
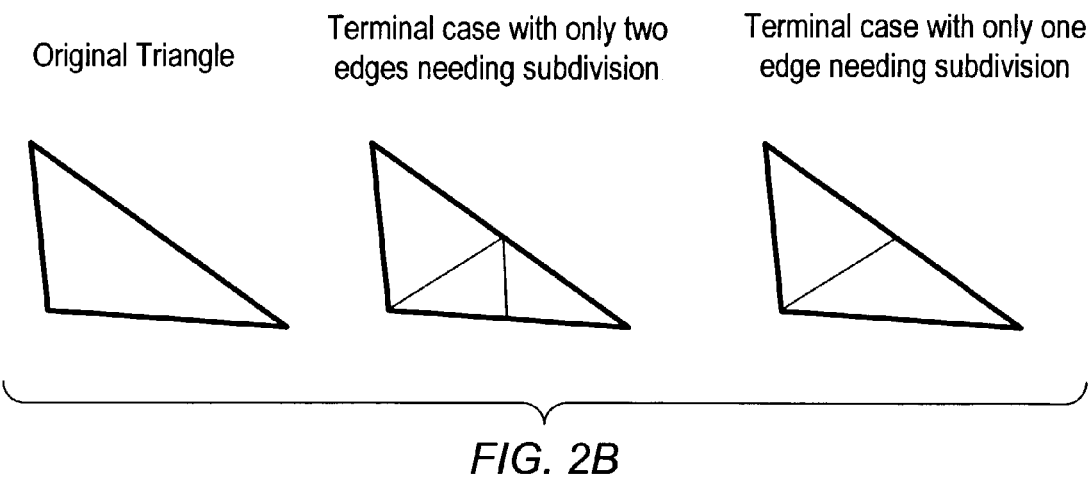
FIG. 2B illustrates several termination criteria for a triangle fragmentation process.

FIG. 2B illustrates means for controlling and terminating a recursive triangle fragmentation. If a triangle resulting from an application of a fragmentation process has all three edges less than or equal to a termination length $L_{term}$, the triangle need not be further fragmented. If a triangle has exactly two edges greater than the termination length $L_{term}$ (as measured in render pixel space), the triangle may be divided into three subtriangles by means of a first segment extending from the midpoint of the longest edge to the opposite vertex, and a second segment extending from said midpoint to the midpoint of the second longest edge. If a triangle has exactly one edge greater than the termination length $L_{term}$, the triangle may be divided into two subtriangles by a segment extending from the midpoint of the longest edge to the opposite vertex.

Figure 3A:
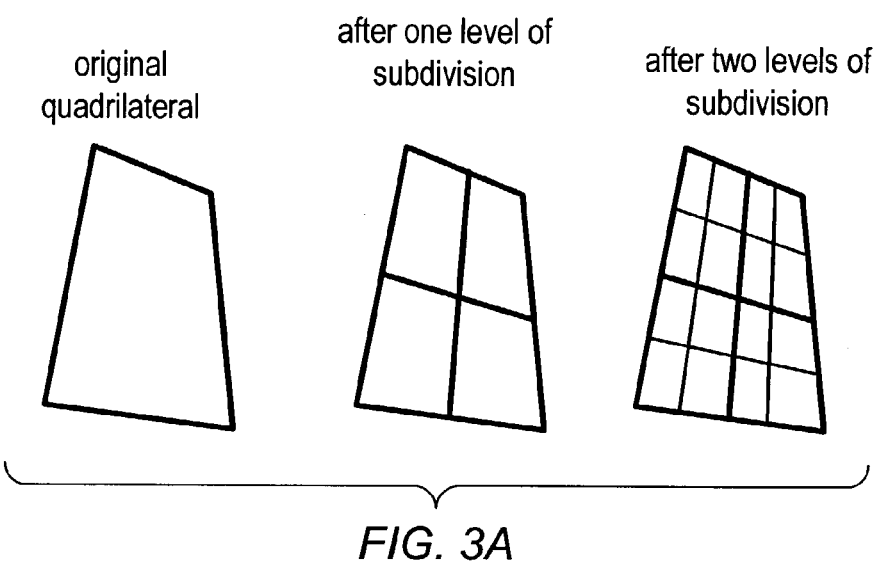
FIG. 3A illustrates one embodiment of a quadrilateral fragmentation process.

Tessellation may also include a quadrilateral fragmentation process that fragments a quadrilateral into four subquadrilaterals by dividing along the two bisectors that each extend from the midpoint of an edge to the midpoint of the opposite edge as illustrated in FIG. 3A. The quadrilateral fragmentation process may be applied recursively to each of the four subquadrilaterals.

Figure 3B:
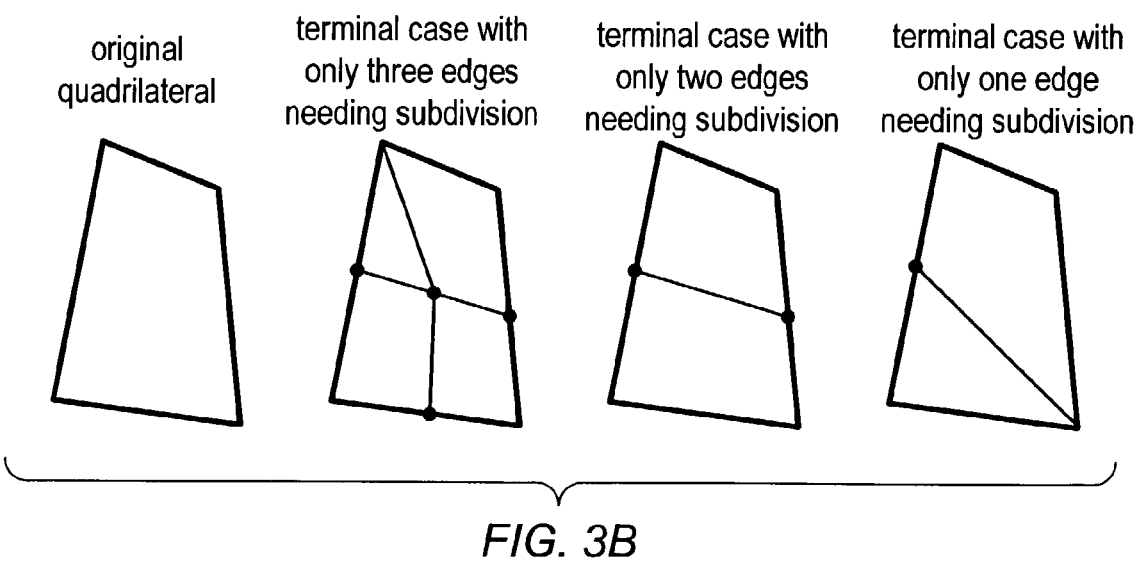
FIG. 3B illustrates several termination criteria for a quadrilateral fragmentation process.

FIG. 3B illustrates means for controlling and terminating a recursive quadrilateral fragmentation. If a quadrilateral resulting from an application of the quadrilateral fragmentation process has all four edges less than or equal to the termination length $L_{term}$, the quadrilateral need not be further fragmented. If the quadrilateral has exactly three edges greater than the termination length $L_{term}$, and the longest and second longest edges are nonadjacent, the quadrilateral may be divided into three subquadrilaterals and a triangle by means of segments extending from an interior point to the midpoints of the three longest edges, and a segment extending from the interior point to the vertex which connects the smallest edge and longest edge. (The interior point may be the intersection of the two lines which each extend from an edge midpoint to the opposite edge midpoint.) If the quadrilateral has exactly two sides greater than the termination length limit $L_{term}$, and the longest edge and the second longest edge are nonadjacent, the quadrilateral may be divided into two subquadrilaterals by means of a segment extending from the midpoint of the longest edge to the midpoint of the second longest edge. If the quadrilateral has exactly one edge greater than the termination length $L_{term}$, the quadrilateral may be divided into a subquadrilateral and a subtriangle by means of a segment extending from the midpoint of the longest edge to the vertex that connects the second longest edge and the third longest edge. The cases given in FIG. 3B are not meant be an exhaustive list of termination criteria.

Figure 4:
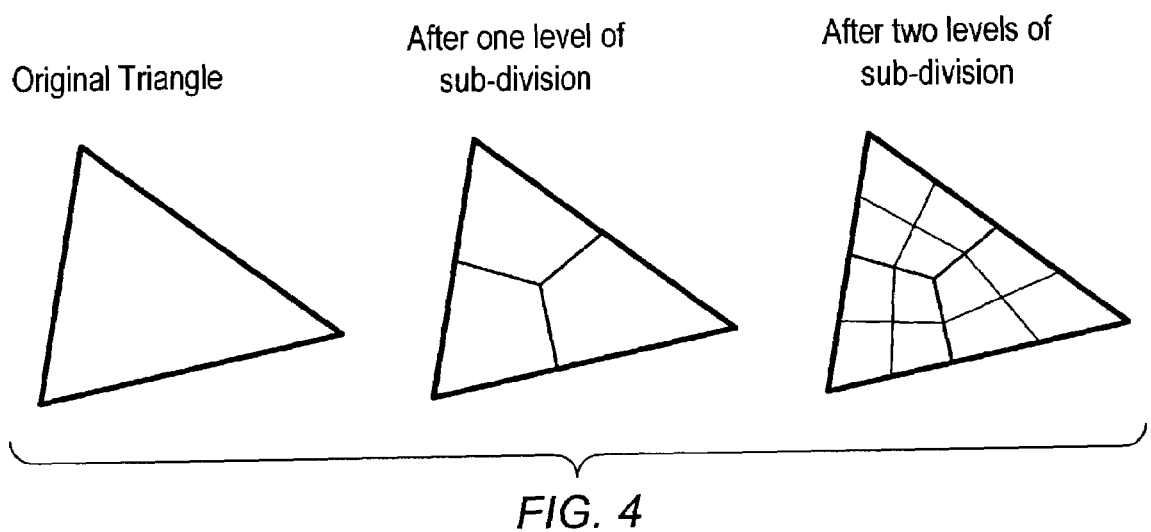
FIG. 4 illustrates one embodiment of a fragmentation process that operates on triangles to generate component quadrilaterals.

In some embodiments, tessellation may include algorithms that divide one type of primitive into components of another type. For example, as illustrated in FIG. 4, a triangle may be divided into three subquadrilaterals by means of segments extending from an interior point (e.g. the triangle centroid) to the midpoint of each edge. (Once the triangle has been the divided into subquadrilaterals, a quadrilateral fragmentation process may be applied recursively to the subquadrilaterals.) As another example, a quadrilateral may be divided into four subtriangles by means of two diagonals that each extend from a vertex of the quadrilateral to the opposite vertex.

Figure 5A:
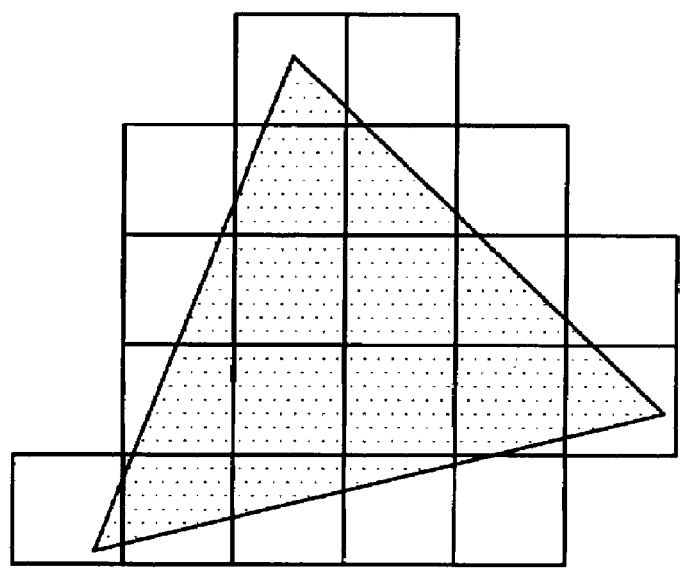
FIGS. 5A and 5B illustrate one embodiment of a method for fragmenting a primitive based on render pixels.
Figure 5B:
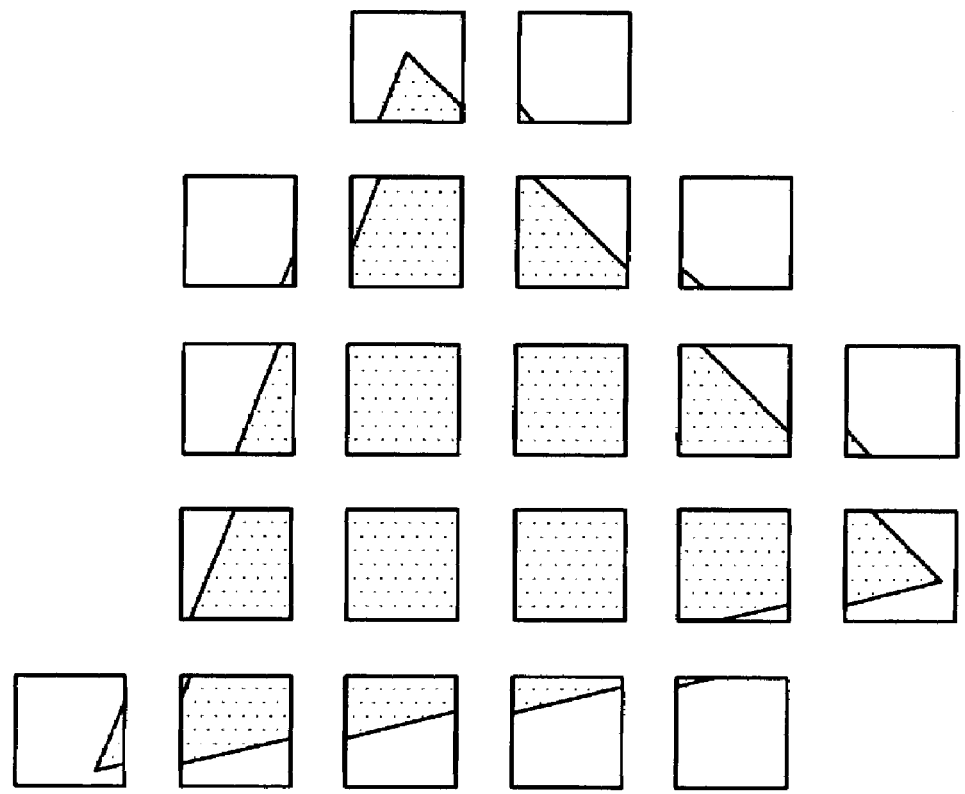

In some embodiments, tessellation may involve the fragmentation of primitives into micropolygons based on an array of render pixels as suggested by FIGS. 5A and 5B. FIG. 5A depicts a triangular primitive as seen in render pixel space. The squares represent render pixels in render pixel space. Thus, the primitive intersects 21 render pixels. Seventeen of these render pixels are cut by one or more edges of the primitive, and four are completely covered by the primitive. A render pixel that is cut by one or more edges of the primitive is referred to herein as a trimmed render pixel (or simply, trimmed pixel). A render pixel that is completely covered by the primitive is referred to herein as a microsquare.

The tessellation process may compute edge-trimming information for each render pixel that intersects a primitive. In one implementation, the tessellation process may compute a slope for an edge of a primitive and an accept bit indicating the side of the edge that contains the interior of the primitive, and then, for each render pixel that intersects the edge, the tessellation process may append to the render pixel (a) the edge's slope, (b) the edge's intercept with the boundary of the render pixel, and (c) the edge's accept bit. The edge-trimming information is used to perform sample fill (described somewhat later).

FIG. 5B illustrates an exploded view of the 21 render pixels intersected by the triangular primitive. Observe that of the seventeen trimmed render pixels, four are trimmed by two primitive edges, and the remaining thirteen are trimmed by only one primitive edge.

In some embodiments, tessellation may involve the use of different fragmentation processes at different levels of scale. For example, a first fragmentation process (or a first set of fragmentation processes) may have a first termination length that is larger than the length limit $L_{max}$. A second fragmentation process (or a second set of fragmentation processes) may have a second termination length that is equal to the length limit $L_{max}$. The first fragmentation process may receive arbitrary sized primitives and break them down into intermediate size polygons (i.e. polygons that have maximum side length less than or equal to the first termination length). The second fragmentation process takes the intermediate size polygons and breaks them down into micropolygons (i.e., polygons that have maximum side length less than or equal to the length limit $L_{max}$).

The rendering pipeline 100 may also support curved surface primitives. The term "curved surface primitive" covers a large number of different non-planar surface patch descriptions, including quadric and Bezier patches, NURBS, and various formulations of sub-division surfaces. Thus, tessellation step 120 may include a set of fragmentation processes that are specifically configured to handle curved surfaces of various kinds.

Given an edge (e.g. the edge of a polygon) defined by the vertices $V_1$ and $V_2$ in camera space, the length of the edge's projection in render pixel space may be computed according to the relation $\|v_2-v_1\|$, where $v_1$ and $v_2$ are the projections of $V_1$ and $V_2$ respectively into render pixel space, where $\|*\|$ denotes a vector norm such as the $L^1$ norm, the $L^\infty$ norm, or Euclidean norm, or, an approximation to a vector norm. The $L^1$ norm of a vector is the sum of the absolute values of the vector components. The $L^\infty$ norm of a vector is the maximum of the absolute values of the vector components. The Euclidean norm of a vector is the square root of the sum of the squares of the vector components.

In some implementations, primitives may be tessellated into "microquads", i.e., micropolygons with at most four edges. In other implementations, primitives may be tessellated into microtriangles, i.e., micropolygons with exactly three edges. More generally, for any integer $N_S$ greater than or equal to three, a hardware system may be implemented to subdivide primitives into micropolygons with at most $N_S$ sides.

Figure 6:
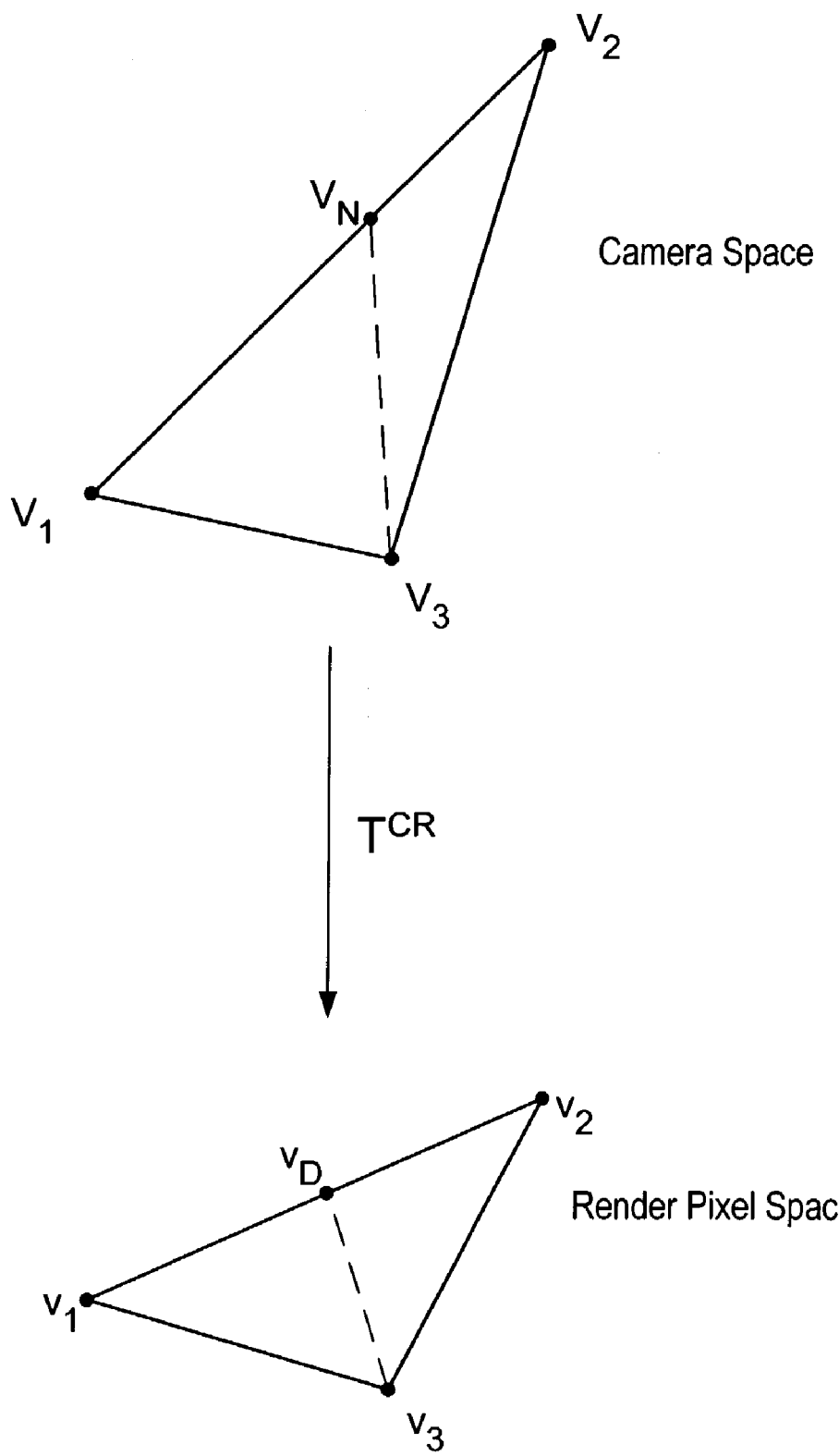
FIG. 6 illustrates a triangle in camera space and its projection into render pixel space.

The tessellation process may involve computations both in camera space and render pixel space as suggested by FIG. 6. A triangle in camera space defined by the vertices $V_1$, $V_2$ and $V_3$ projects onto a triangle in render pixel space defined by the vertices $v_1$, $v_2$ and $v_3$ respectively, i.e., $v_k=T^{CR}V_k$ for $k=1, 2, 3$. If a new vertex $V_N$ is injected along the edge from $V_1$ to $V_2$, two new subtriangles, having as their common edge the line segment from $V_N$ to $V_3$, may be generated.

Because the goal of the tessellation process is to arrive at component pieces which are sufficiently small as seen in render pixel space, the tessellation process may initially specify a scalar value $\sigma^R$ which defines a desired location $v_D$ along the screen space edge from v1 to v2 according to the relation $v_D=(1-\sigma^R)*v_1+\sigma^R*v_2$. (For example, one of the fragmentation processes may aim at dividing the screen space edge from v1 to v2 at its midpoint. Thus, such a fragmentation process may specify the value $\sigma^R=0.5$.) Instead of computing $v_D$ directly and then applying the inverse mapping $(T^{CR})^{-1}$ to determine the corresponding camera space point, the scalar value $\sigma^R$ may then be used to compute a scalar value $\sigma^C$ with the property that the projection of the camera space position $$V_N=(1-\sigma^C)*V_1+\sigma^C*V_2$$

into render pixel space equals (or closely approximates) the screen space point $v_D$. The scalar value $\sigma^C$ may be computed according to the formula:

$$\sigma^C = \left(\frac{1}{W_2-W_1}\right)\left(\frac{1}{\frac{1}{W_1}+\sigma^R\cdot\left(\frac{1}{W_2}-\frac{1}{W_1}\right)}-W_1\right),$$

where $W_1$ and $W_2$ are the W coordinates of camera space vertices $V_1$ and $V_2$ respectively. The scalar value $\sigma^C$ may then be used to compute the camera space position $V_N=(1-\sigma^C)*V_1+\sigma^C*V_2$ for the new vertex. Note that $\sigma^C$ is not generally equal to $\sigma^R$ since the mapping $T^{CR}$ is generally not linear. (The vertices $V_1$ and $V_2$ may have different values for the W coordinate.)

As illustrated above, tessellation includes the injection of new vertices along the edges of primitives and in the interior of primitives. Data components (such as color, surface normal, texture coordinates, texture coordinate derivatives, transparency, etc.) for new vertices injected along an edge may be interpolated from the corresponding data components associated with the edge endpoints. Data components for new vertices injecting in the interior of a primitive may be interpolated from the corresponding data components associated with the vertices of the primitive.

In step 122, a programmable displacement shader (or a set of programmable displacement shaders) may operate on the vertices of the micropolygons. A user may program the processing algorithm(s) implemented by the displacement shader(s). The displacement shader(s) move the vertices in camera space. Thus, the micropolygons may be perturbed into polygons that no longer qualify as micropolygons (because their size as viewed in render pixel space has increased beyond the maximum size constraint). For example, the vertices of a microtriangle which is facing almost "on edge" to the virtual camera may be displaced in camera space so that the resulting triangle has a significantly larger projected area or diameter in render pixel space. Therefore, the polygons resulting from the displacement shading may be fed back to step 120 for tessellation into micropolygons. The new micropolygons generated by tessellation step 120 may be forwarded to step 122 for another wave of displacement shading or to step 125 for surface shading and light shading.

In step 125, a set of programmable surface shaders and/or programmable light source shaders may operate on the vertices of the micropolygons. The processing algorithm performed by each of the surface shaders and light source shaders may be programmed by a user. After any desired programmable surface shading and lighting have been performed on the vertices of the micropolygons, the micropolygons may be forwarded to step 130.

Figure 7:
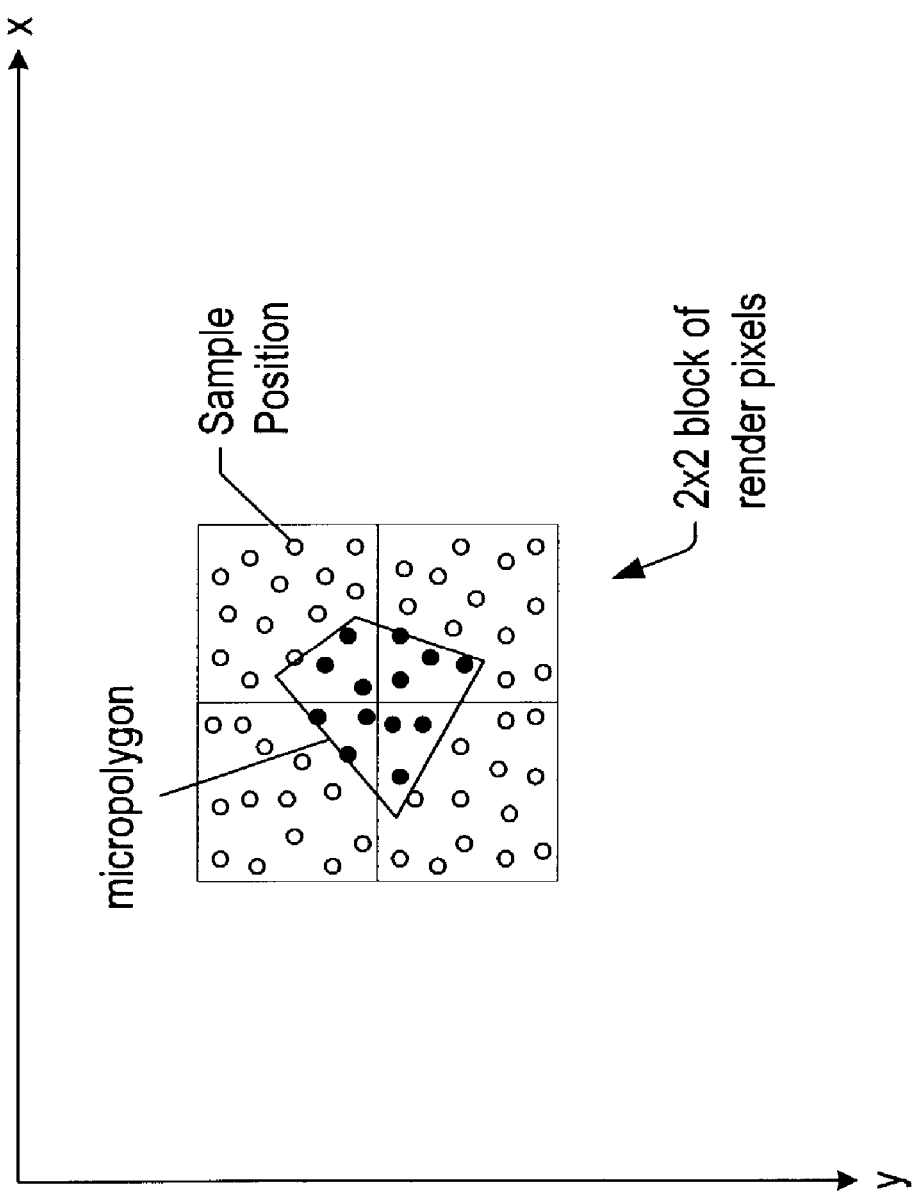
FIG. 7 illustrates a process for filling a micropolygon with samples.

In step 130, a sample fill operation is performed on the micropolygons as suggested by FIG. 7. A sample generator may generate a set of sample positions for each render pixel that has a nonempty intersection with the micropolygon. The sample positions that reside interior to the micropolygon may be identified as such. A sample may then be assigned to each interior sample position in the micropolygon. The contents of a sample may be user defined. Typically, the sample includes a color vector (e.g., an RGB vector) and a depth value (e.g., a z value or a 1/W value).

The algorithm for assigning samples to the interior sample positions may vary from one hardware implementation to the next. For example, according to a "flat fill" algorithm, each interior sample position of the micropolygon may be assigned the color vector and depth value of a selected one of the micropolygon vertices. The selected micropolygon vertex may be the vertex which has the smallest value for the sum x+y, where x and y are the render pixel space coordinates for the vertex. If two vertices have the same value for x+y, then the vertex that has the smaller y coordinate, or alternatively, x coordinate, may be selected. Alternatively, each interior sample position of the micropolygon may be assigned the color vector and depth value of the closest vertex of the micropolygon vertices.

According to an "interpolated fill" algorithm, the color vector and depth value assigned to an interior sample position may be interpolated from the color vectors and depth values already assigned to the vertices of the micropolygon.

According to a "flat color and interpolated z" algorithm, each interior sample position may be assigned a color vector based on the flat fill algorithm and a depth value based on the interpolated fill algorithm.

The samples generated for the interior sample positions are stored into a sample buffer 140. Sample buffer 140 may store samples in a double-buffered fashion (or, more generally, in an multi-buffered fashion where the number N of buffer segments is greater than or equal to two). In step 145, the samples are read from the sample buffer 140 and filtered to generate video pixels.

Figure 8:
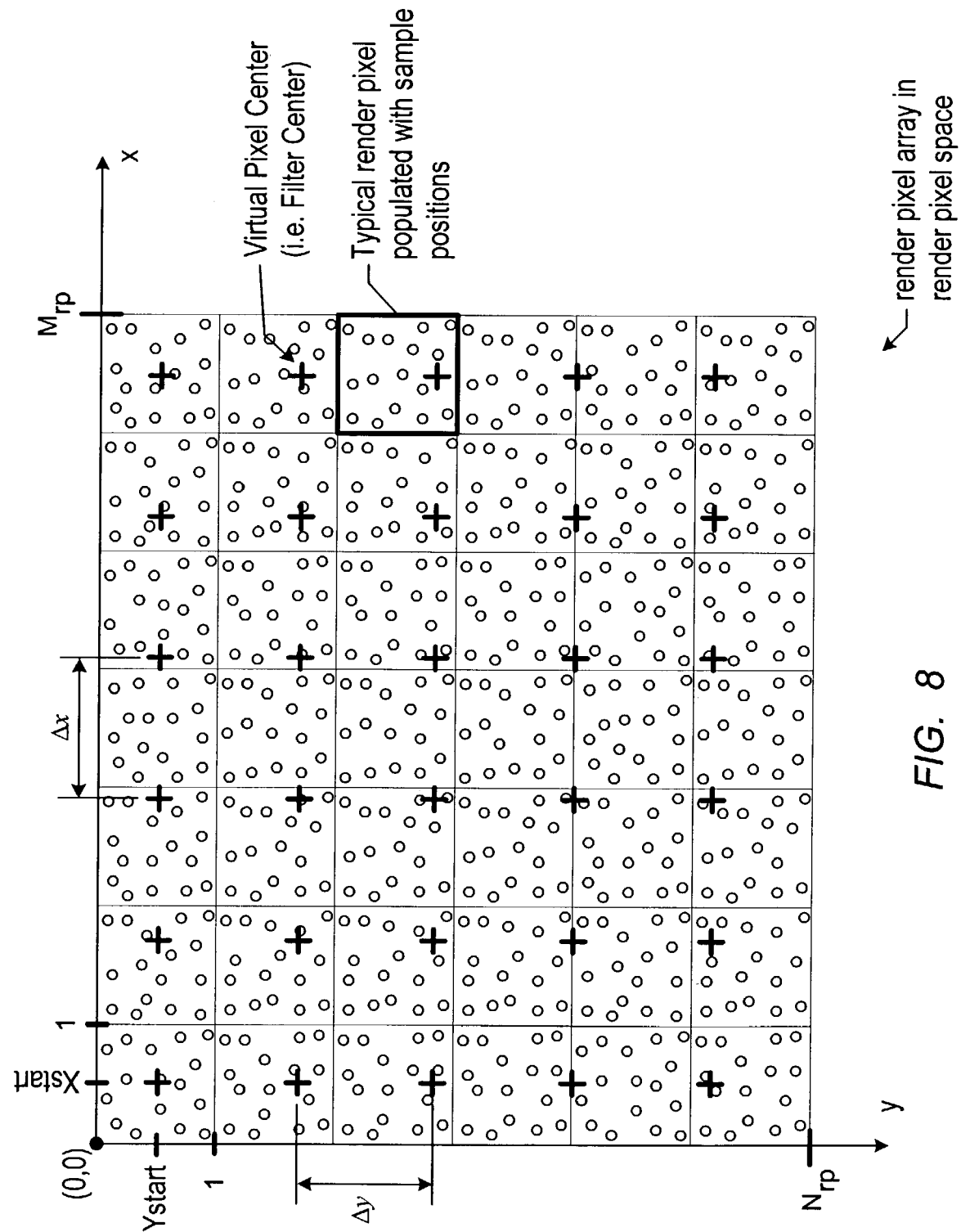
FIG. 8 illustrates an array of virtual pixel positions superimposed on an array of render pixels in render pixel space.

The rendering pipeline 100 may be configured to render primitives for an $M_{rp} \times N_{rp}$ array of render pixels in render pixel space as suggested by FIG. 8. Each render pixel may be populated with $N_{sd}$ sample positions. The values $M_{rp}$, $N_{rp}$ and $N_{sd}$ are user-programmable parameters. The values $M_{rp}$ and $N_{rp}$ may take any of a wide variety of values, especially those characteristic of common video formats.

The sample density $N_{sd}$ may take any of a variety of values, e.g., values in the range from 1 to 16 inclusive. More generally, the sample density $N_{sd}$ may take values in the interval $[1, M_{sd}]$, where $M_{sd}$ is a positive integer. It may be convenient for $M_{sd}$ to equal a power of two such as 16, 32, 64, etc. However, powers of two are not required.

The storage of samples in the sample buffer 140 may be organized according to memory bins. Each memory bin corresponds to one of the render pixels of the render pixel array, and stores the samples corresponding to the sample positions of that render pixel.

The filtering process may scan through render pixel space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters. Thus, the size of the render pixel array may be different from the size of the video pixel array.

Figure 9:
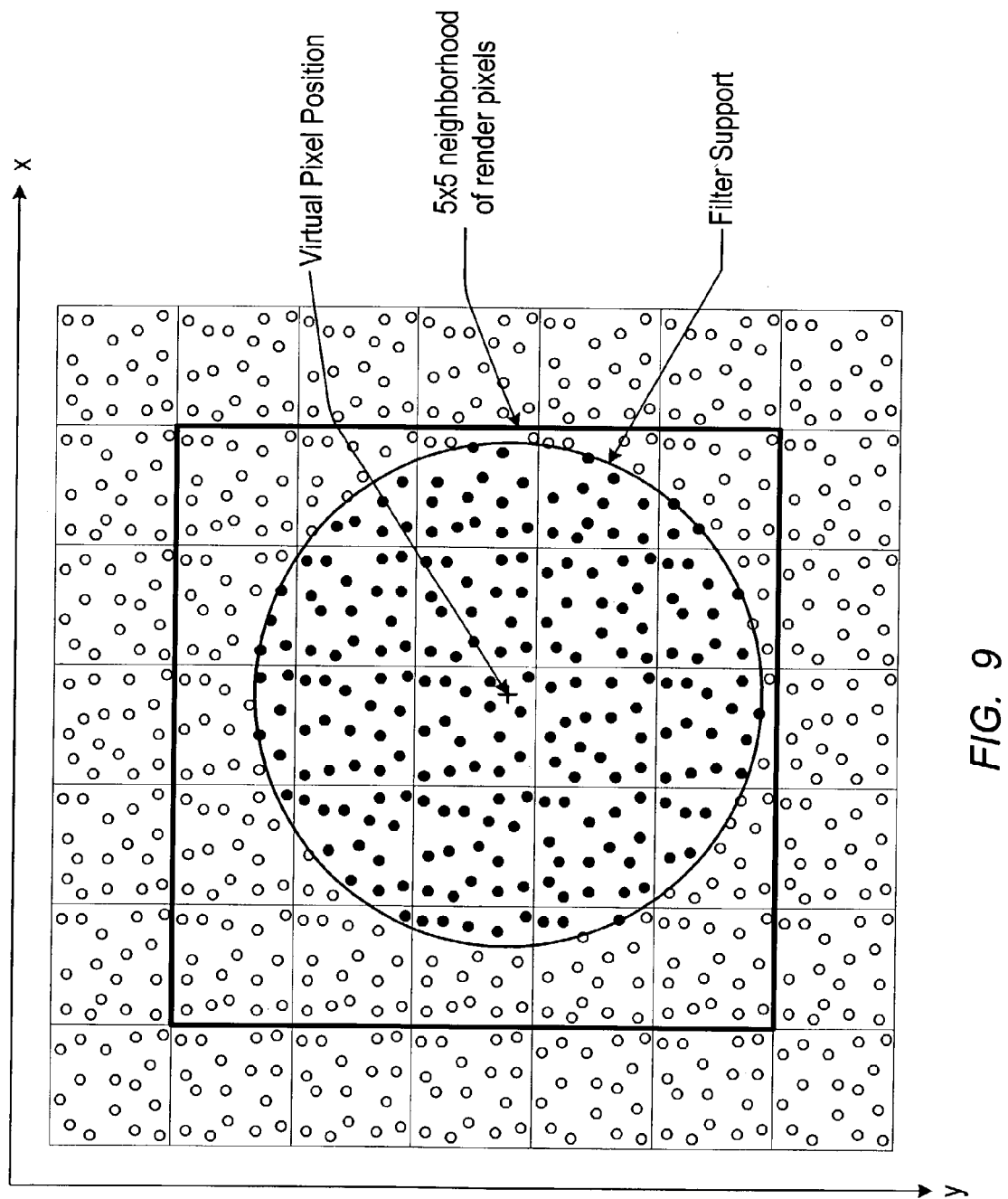
FIG. 9 illustrates the computation of a pixel at a virtual pixel position (denoted by the plus marker) according to one set of embodiments.

The filtering process may compute a video pixel at a particular virtual pixel position as suggested by FIG. 9. The filtering process may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering process may compute an initial red value $r_P$ for the video pixel P according to the expression $$r_P = \Sigma C_S r_S,$$

where the summation ranges over each sample S in the filter support region, and where $r_S$ is the red color component of the sample S. In other words, the filtering process may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering process may compute a normalization value E by adding up the filter coefficients $C_S$ for the samples S in the filter support region, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

The filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in render pixel space on which the filter is defined. The terms "filter" and "kernel" are used as synonyms herein. Let $R_f$ denote the radius of the circular support disk.

Figure 10:
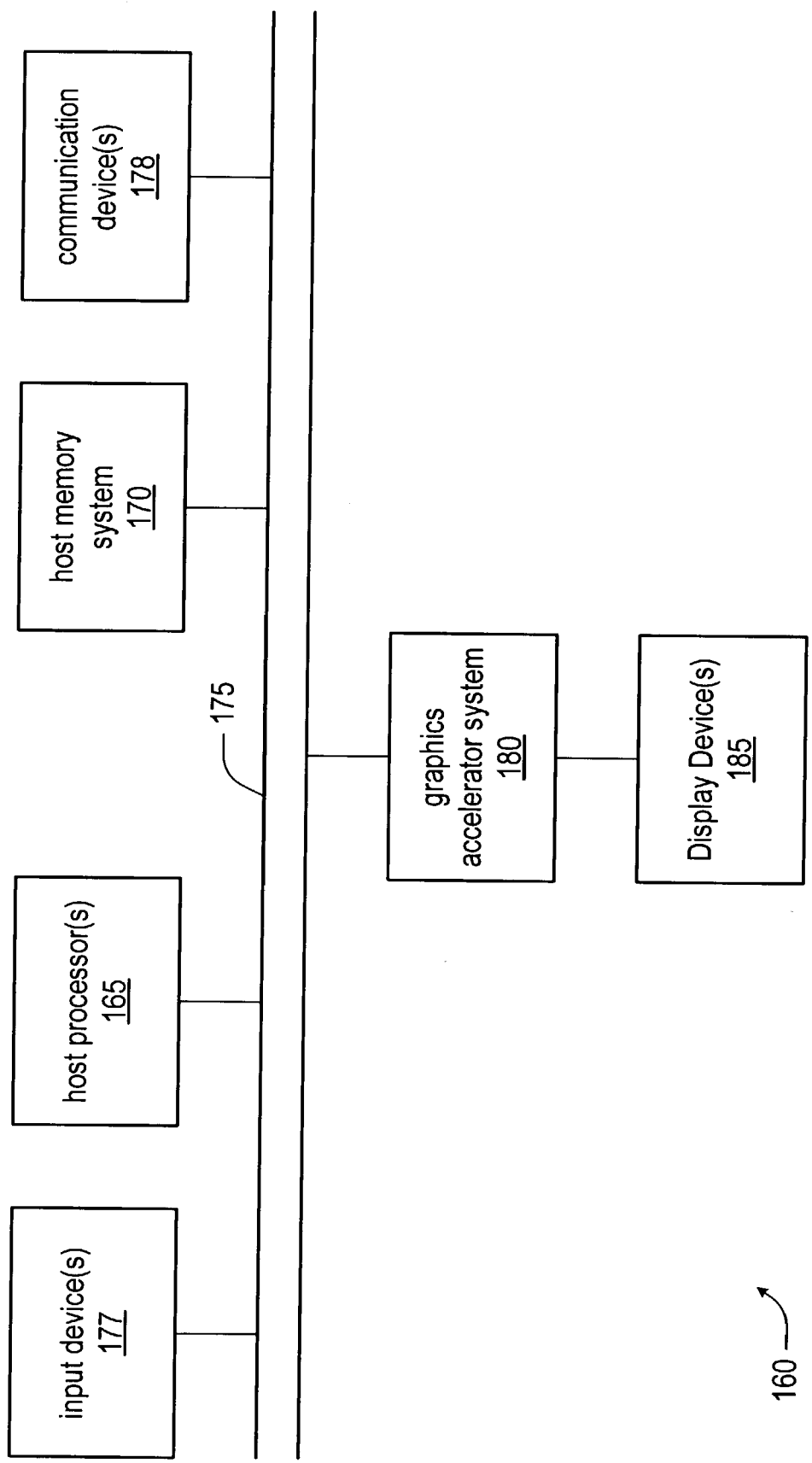
FIG. 10 illustrates one set of embodiments of computational system configured to perform graphical rendering computations.

FIG. 10 illustrates one set of embodiments of a computational system 160 operable to perform graphics rendering computations. Computational system 160 includes a set of one or more host processors 165, a host memory system 170, a set of one or more input devices 177, a graphics accelerator system 180 (also referred to herein as a graphics accelerator), and a set of one or more display devices 185. Host processor(s) 165 may couple to the host memory system 170 and graphics system 180 through a communication medium such as communication bus 175, or perhaps, through a computer network.

Host memory system 170 may include any desired set of memory devices, e.g., devices such as semiconductor RAM and/or ROM, CD-ROM drives, magnetic disk drives, magnetic tape drives, bubble memory, etc. Input device(s) 177 include any of a variety of devices for supplying user input, i.e., devices such as a keyboard, mouse, track ball, head position and/or orientation sensors, eye orientation sensors, data glove, light pen, joystick, game control console, etc. Computational system 160 may also include a set of one or more communication devices 178. For example, communication device(s) 178 may include a network interface card for communication with a computer network.

Graphics system 180 may be configured to implement the graphics computations associated with rendering pipeline 100. Graphics system 180 generates a set of one or more video signals (and/or digital video streams) in response to graphics data received from the host processor(s) 165 and/or the host memory system 170. The video signals (and/or digital video streams) are supplied as outputs for the display device(s) 185.

In one embodiment, the host processor(s) 165 and host memory system 170 may reside on the motherboard of a personal computer (or personal workstation). Graphics system 180 may be configured for coupling to the motherboard.

Figure 11:
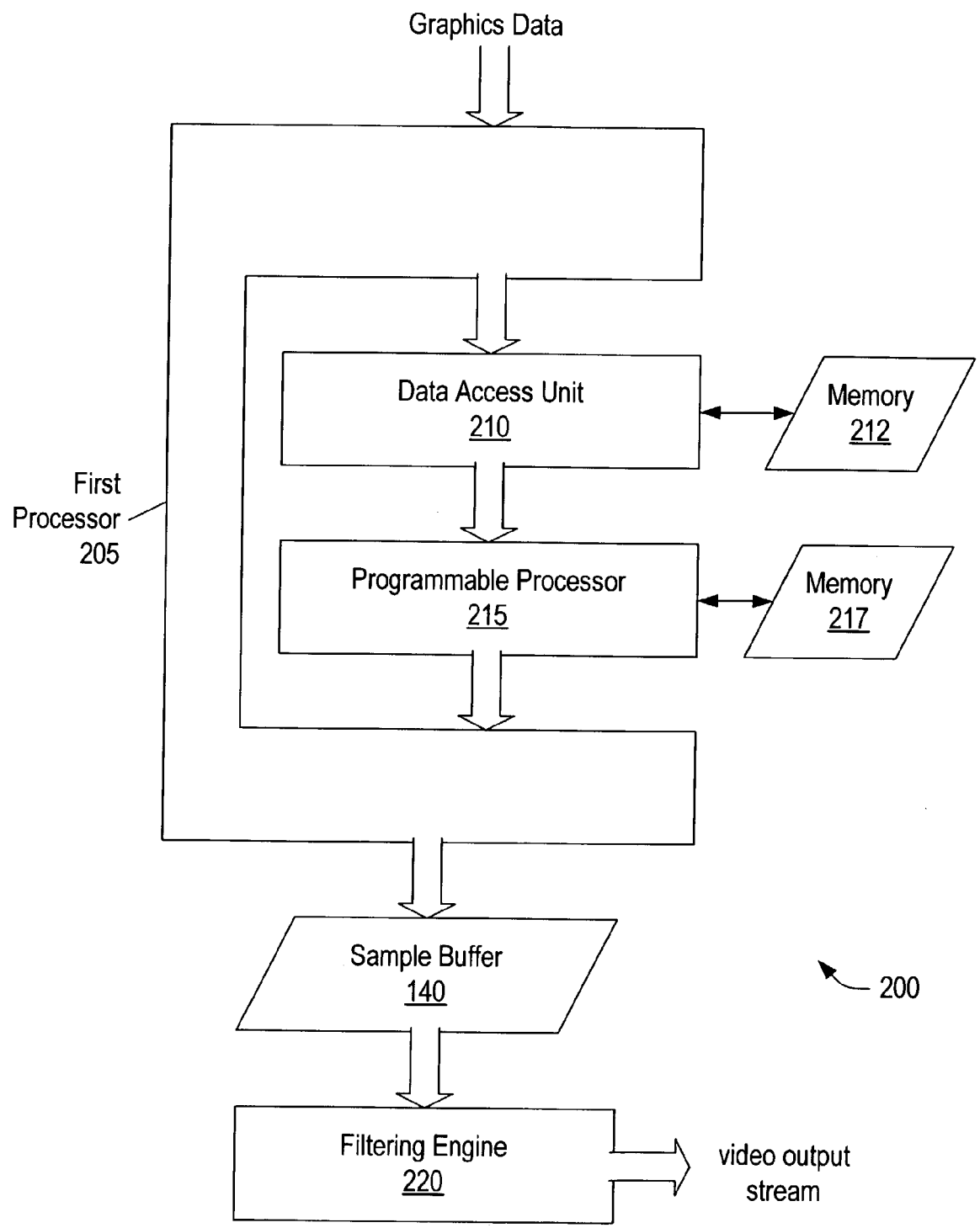
FIG. 11 illustrates one embodiment of a graphics system configured to perform per pixel programming shading.

The rendering pipeline 100 may be implemented in hardware in a wide variety of ways. For example, FIG. 11 illustrates one embodiment of a graphics system 200 that implements the rendering pipeline 100. Graphics system 200 includes a first processor 205, a data access unit 210, programmable processor 215, sample buffer 140 and filtering engine 220. The first processor 205 may implement steps 110, 112, 115, 120 and 130 of the rendering pipeline 100. Thus, the first processor 205 may receive a stream of graphics data from a graphics processor, pass micropolygons to data access unit 210, receive shaded micropolygons from the programmable processor 215, and transfer samples to sample buffer 140. In one set of embodiments, graphics system 200 may serve as graphics accelerator system 180 in computational system 160.

The programmable processor 215 implements steps 122 and 125, i.e., performs programmable displacement shading, programmable surface shading and programmable light source shading. The programmable shaders may be stored in memory 217. A host computer (coupled to the graphics system 200) may download the programmable shaders to memory 217. Memory 217 may also store data structures and/or parameters that are used and/or accessed by the programmable shaders. The programmable processor 215 may include one or more microprocessor units that are configured to execute arbitrary code stored in memory 217.

Data access unit 210 may be optimized to access data values from memory 212 and to perform filtering operations (such as linear, bilinear, trilinear, cubic or bicubic filtering) on the data values. Memory 212 may be used to store map information such as bump maps, displacement maps, surface texture maps, shadow maps, environment maps, etc. Data access unit 210 may provide filtered and/or unfiltered data values (from memory 212) to programmable processor 215 to support the programmable shading of micropolygon vertices in the programmable processor 215.

Data access unit 210 may include circuitry to perform texture transformations. Data access unit 210 may perform a texture transformation on the texture coordinates associated with a micropolygon vertex. Furthermore, data access unit 210 may include circuitry to estimate a mip map level λ from texture coordinate derivative information. The result of the texture transformation and the mip map level (MML) estimation may be used to compute a set of access addresses in memory 212. Data access unit 210 may read the data values corresponding to the access addresses from memory 212, and filter the data values to determine a filtered value for the micropolygon vertex. The filtered value may be bundled with the micropolygon vertex and forwarded to programmable processor 215. Thus, the programmable shaders may use filtered map information to operate on vertex positions, normals and/or colors, if the user so desires.

Filtering engine 220 implements step 145 of the rendering pipeline 100. In other words, filtering engine 220 reads samples from sample buffer 140 and filters the samples to generate video pixels. The video pixels may be supplied to a video output port in order to drive a display device such as a monitor, a projector or a head-mounted display.

Method for Real Time Displacement Shading

Figure 12:
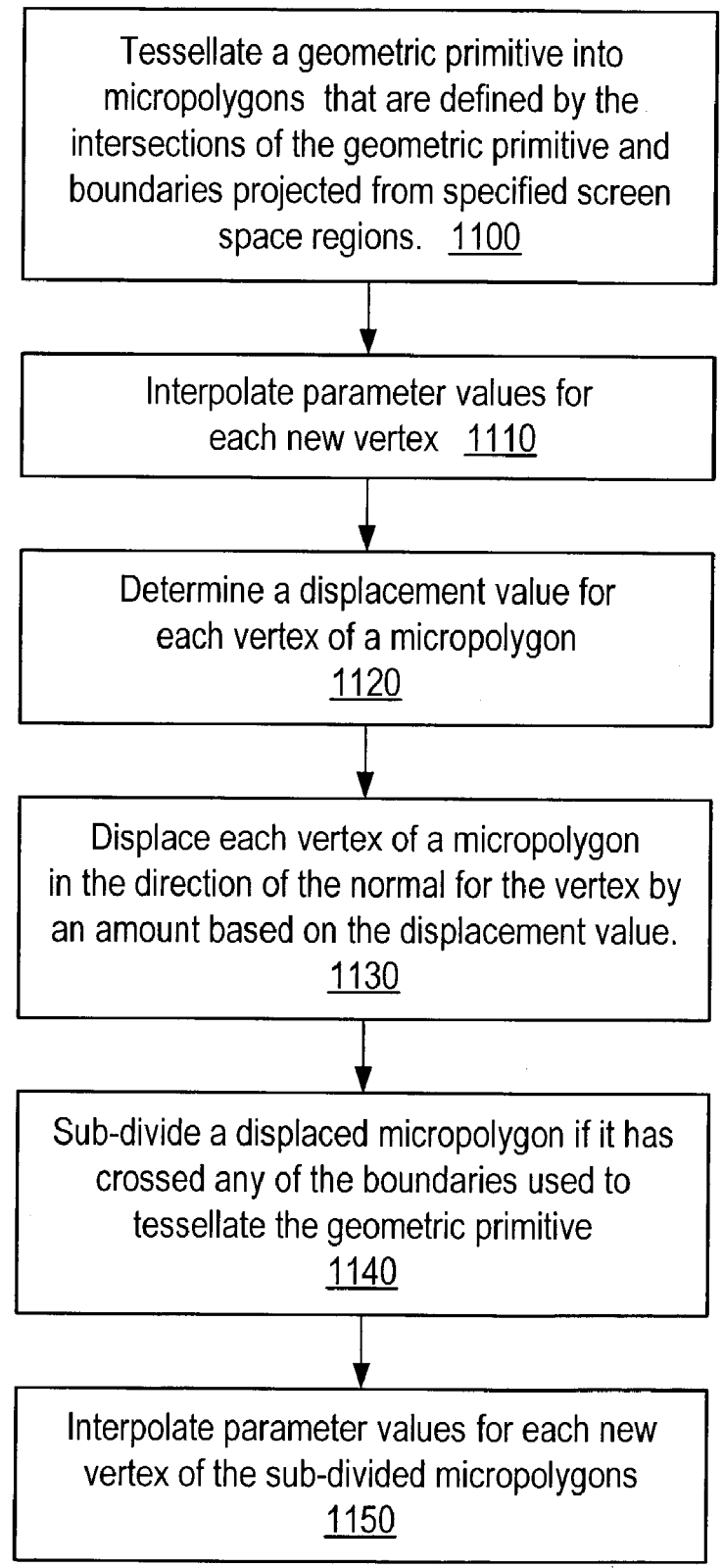
FIG. 12 provides a flow chart for one set of embodiments of a method for displacement mapping.

The flowchart presented in FIG. 12 illustrates a set of embodiments for a method for displacement shading (including displacement mapping) of micropolygons. This method includes sub-dividing and/or tessellating a geometric primitive into micropolygons (step 1100), where the micropolygons are defined by the intersection of the geometric primitive and boundaries projected from specified screen space regions; interpolating parameter values for each newly created vertex based on the normals corresponding to the vertexes of the geometric primitive (step 1110); determining a displacement value for each vertex of a micropolygon (step 1120); displacing each vertex of a micropolygon in the direction of the normal at the vertex (or in a specified direction) by an amount based on the corresponding displacement amount (step 1130); sub-dividing a displaced micropolygon into two or more new micropolygons, if the boundaries projected from specified screen space regions intersect the displaced micropolygon (step 1140); and interpolating parameter values for each new vertex of the two or more sub-divided new micropolygons (step 1150). Parameter values for a vertex include, but are not limited to, a normal at the vertex and displacement map coordinates.

Many of the embodiments presented herein are described in terms of performing displacement mapping on tessellated geometry. However, the inventive principles described herein apply not only to displacement mapping, but also to displacement shaders in general and to other sub-division schemes.

In some embodiments, a specified screen space region may be a region of screen space corresponding to a pixel, or a portion of a pixel. In other embodiments, a specified screen space region may be a region of screen space corresponding to a group of pixels, such as a 2×2 tile of 4 pixels. In still other embodiments, a specified screen space region may be a region of screen space corresponding to a group of pixels, such as an n×m array of pixels, where n and m are positive integers.

In one set of embodiments, the displacement amount may be based on a specified set of displacement values. The specified set of displacement values may be a displacement map stored in a memory. The displacement map value selected for a vertex may be the value at a map location that is closest to the map coordinates corresponding to the vertex, or the displacement map value selected for a vertex may be interpolated from values for multiple map locations that surround the map location corresponding to the vertex. The displacement amount may equal the displacement map value times a scalar value. The scalar value may be computer generated, or specified by a user. A specific scalar value may be applied to a group of micropolygons that represent a specific graphics object. In other embodiments, the displacement map may contain vector displacement values, thereby specifying both a direction and a displacement value.

The method may also include outputting displaced micropolygons to a sample generation pipeline. The displacement of micropolygons may be processed at a rate to support a real-time video data stream.

In some embodiments, an edge contract may be used when displacing surfaces to prevent surface cracks. Potential surface cracks may be created when a polygon is subdivided into a plurality of adjacent smaller polygons. A new vertex that is common to more than one of the smaller polygons may have different locations and different normals as each of the smaller polygons is rendered. When this occurs, the displacement of the adjacent smaller polygons will be in different directions and surface cracks may be perceived. The common vertex may also receive different displacement values when the different adjacent smaller polygons are displaced. When this occurs, the displacement of the surface of adjacent smaller polygons will have different heights and a surface discontinuity may be perceived.

Figure 13A:
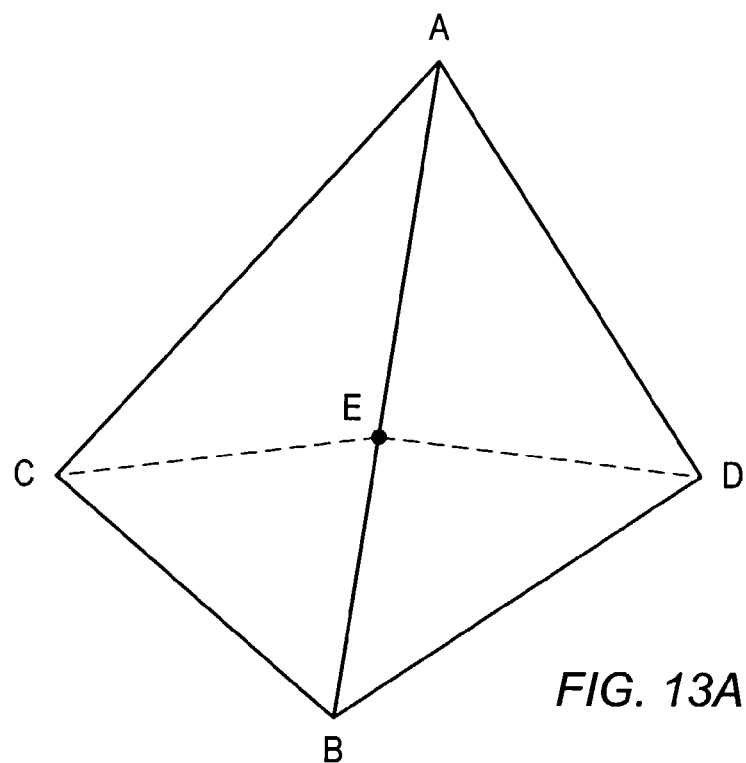
FIG. 13a illustrates a partitioning point on the common edge of two adjacent triangles.
Figure 13B:
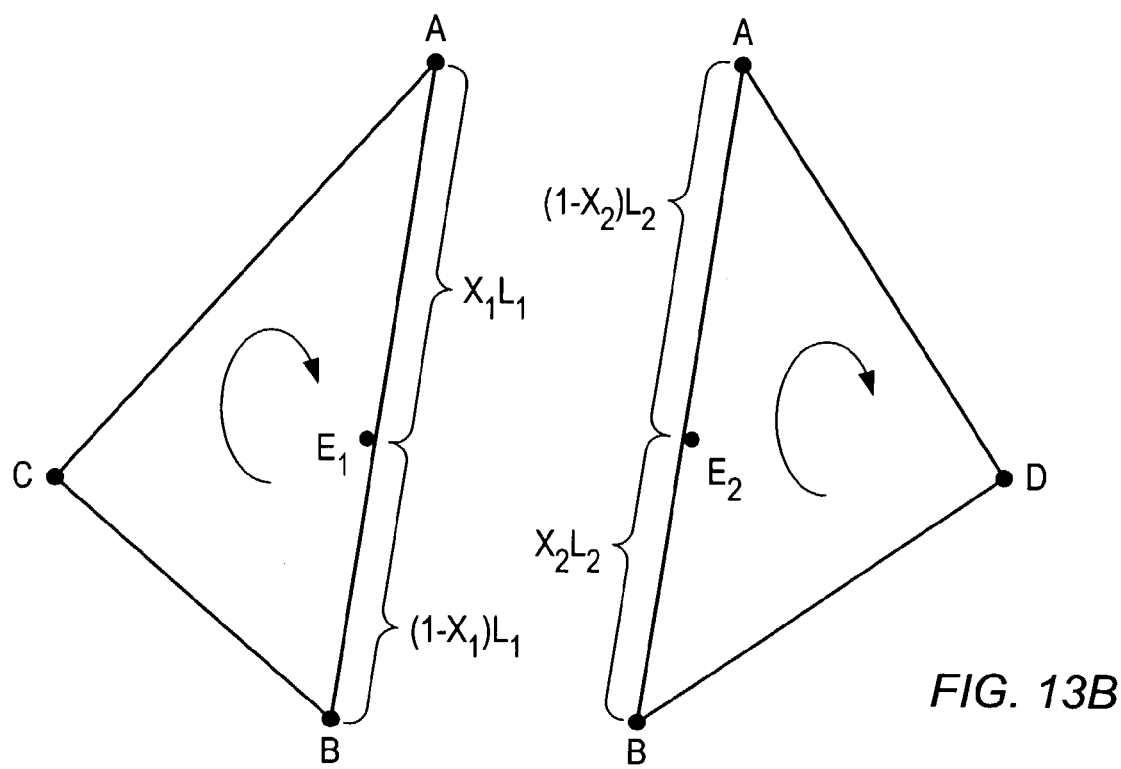
FIG. 13b illustrates the possibility of determining two different locations of a partitioning point on the common edge of two adjacent triangles.

FIGS. 13a and 13b illustrate this crack creation process. FIG. 13a shows two adjacent triangles ABC and ADB and a selected subdivision point E (also referred to as a partitioning point) for both triangles. FIG. 13b illustrates the potential determination of two different locations for E when using a clockwise ordering of vertices. $E_1$ for triangle ABC and $E_2$ for triangle ADB. L is the vector difference between the vertex locations A and B. The vertex E will be defined by adding a specified fraction of L (represented as XL) to either vertex A or B. In triangle ABC, $E_1$ equals $A+X_1L_1$. In triangle ADB, $E_2$ equals $B+X_2L_2$. In these vector equations $L_1=-L_2$, and the fractions $X_1+X_2=1$. Differences between $E_1$ and $E_2$ will arise due to the truncation or rounding of the products of the multiplications $X_1L_1$ and $X_2L_2$.

Figure 15:
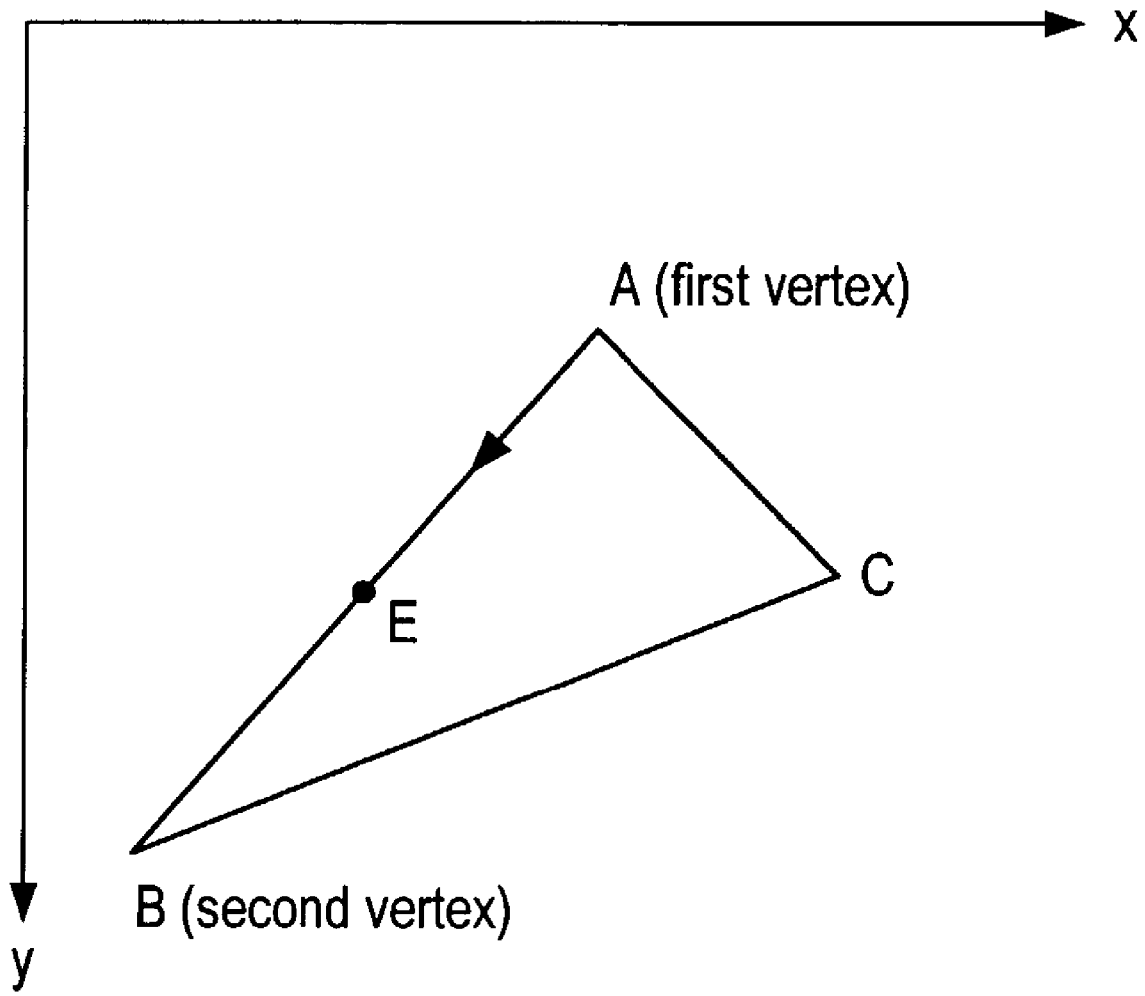
FIG. 15 illustrates one embodiment of the edge contract method for selecting a first vertex.
Figure 16:
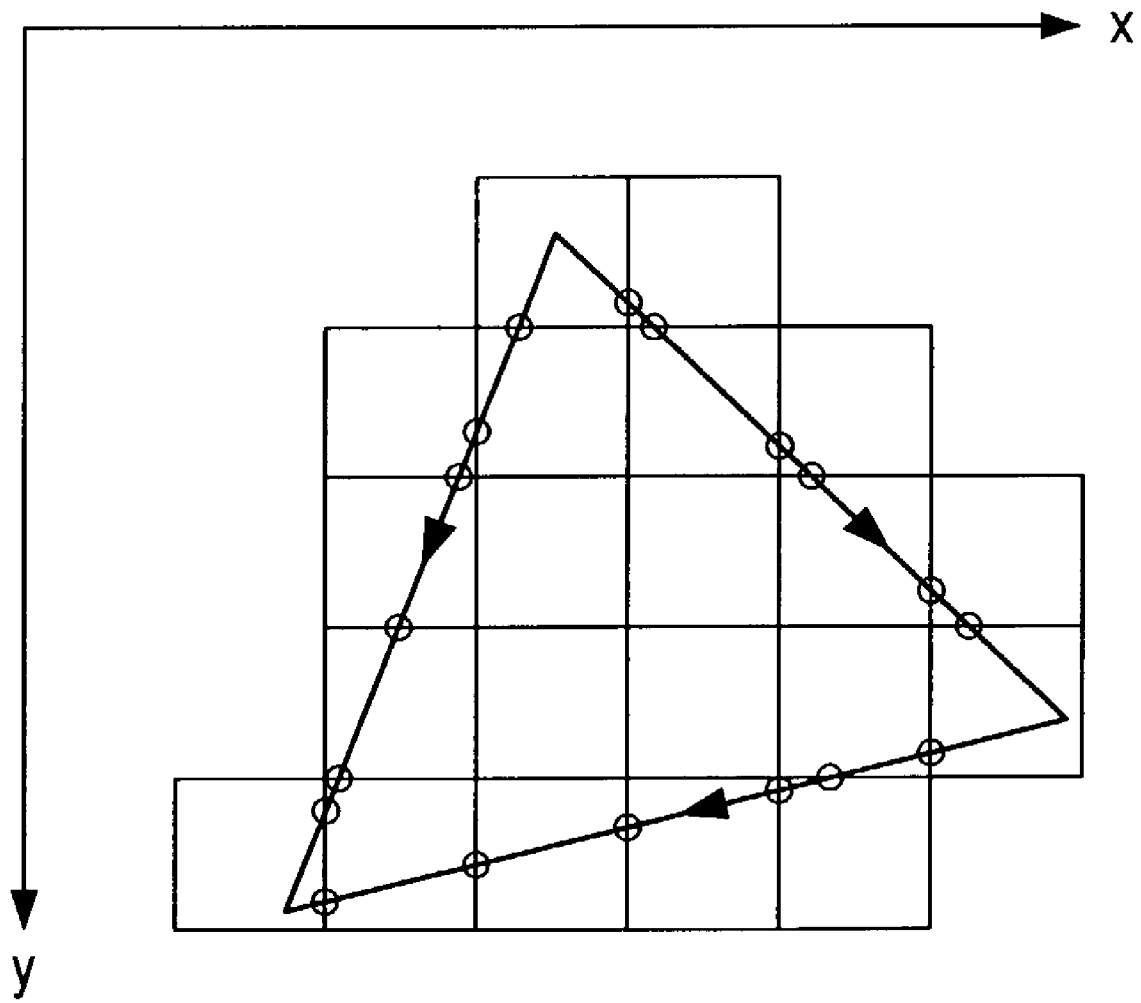
FIG. 16 illustrates one embodiment of the edge contract method for tessellating a polygon.

The edge contract method is detailed in FIGS. 14, 15, and 16. This method may prevent surface cracks and discontinuities by standardizing the process of calculating the locations of new vertices on an edge and using interpolation algorithms that are applied only to the parameter values for the two vertices that define the edge.

FIG. 14 provides a flow chart of one set of embodiments of the edge contract method including one or more of the actions of a) receiving parameter values corresponding to two vertices, where the two vertices define an edge of one or more polygons, where the parameter values for each vertex of the two vertices comprise a normal, texture coordinates, and derivatives of vertex coordinates as a function of texture coordinates, and where each parameter value is determined specifically for the corresponding vertex location (step 500); b) selecting a first vertex and a second vertex from the two vertices defining the edge, where the selection of a first vertex is independent of the order the two vertices are received and independent of the one or more polygons containing the edge (step 510); c) selecting one or more partitioning points along the edge between the first and second vertex, where each point (or new vertex) is referenced to the first vertex (step 520); d) interpolating parameter values at each of the one or more partition points, where the interpolated parameter values are based only on the location of each partition point referenced to the first vertex and the parameter values and locations of the two vertices that define the edge (step 530).

In one set of embodiments, the selection of a first vertex depends only on position coordinates of the two vertices. In some of these embodiments, a vertex with a minimum y coordinate may be selected as the first vertex, wherein if the y coordinates for the two vertices are equal, the vertex with a minimum x coordinate may be selected as the first vertex, and wherein if the x and y coordinates for the two vertices are equal, the vertex with a minimum z coordinate may be selected as the first vertex. This selection method is illustrated in FIG. 15. In other embodiments, a vertex with a maximum y coordinate may be selected as the first vertex, wherein if the y coordinates for the two vertices are equal, the vertex with a maximum x coordinate may be selected as the first vertex, and wherein if the x and y coordinates for the two vertices are equal, the vertex with a maximum z coordinate may be selected as the first vertex. In still other embodiments, combinations of maximum and minimum coordinates may be used to select a first vertex.

The one or more partitioning points along the edge from the first vertex may correspond to new vertex locations on the edge for subdivision of the one or more polygons containing the edge into smaller polygons or micropolygons. The one or more partitioning points along the edge from the first vertex may also correspond to the intersections of the edge with projected render pixel boundaries, which is illustrated in FIG. 16.

The interpolation of the parameter values for a new partitioning point in the edge contract method utilizes interpolation algorithms that depend on the parameter values explicitly specified for the locations of the first and second vertices that define the edge. Therefore, the parameter values for the new partitioning points are independent of parameter values for other vertices of the one or more polygons.

Parameter values for a partitioning point may be determined by using a linear interpolation referenced to the first vertex. For example, the parameter values may be computed as the sum of X times the parameter values of the first vertex plus 1–X times the parameter values of the second vertex, and where X is the distance between the partitioning point and the first vertex divided by the length of the edge.

System for Real Time Displacement Mapping

Figure 17:
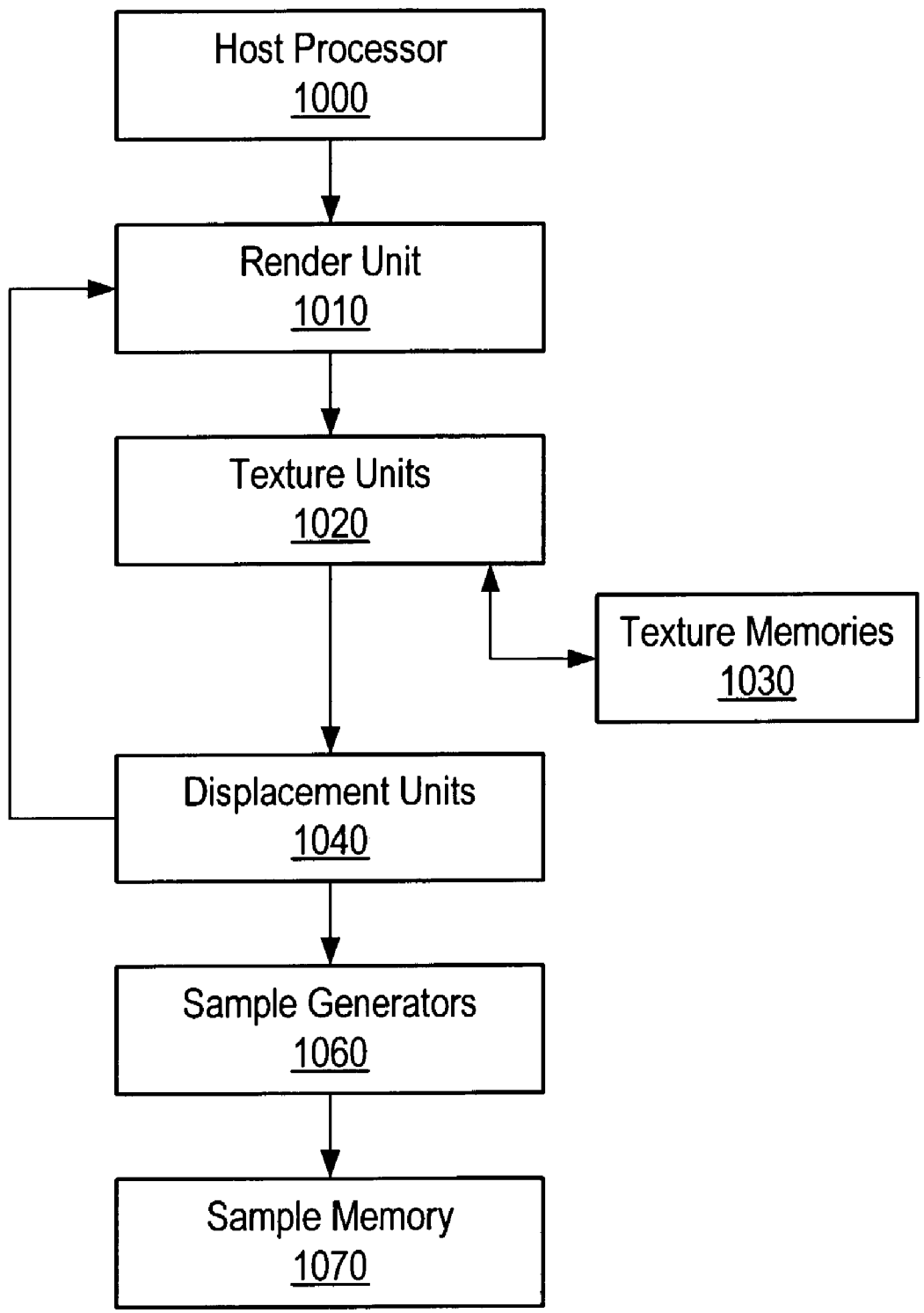
FIG. 17 illustrates one set of embodiments of a system for displacement mapping.

One set of embodiments for a processing pipeline in a graphics system that may be capable of real time displacement mapping of primitives is illustrated in FIG. 17. This system may include a host processor or computer 1000 that may convert graphic objects into a stream of primitives and may specify a normal for each vertex of each primitive. One or more rasterizers or render units 1010 may sub-divide and/or tessellate geometric primitives into micropolygons and interpolate a normal for each new vertex created.

Displacement maps may be stored in one or more memories or texture memories 1030. One or more texture units 1020 may retrieve displacement values from a displacement map for map locations that surround or are near the map location that corresponds to a specific vertex location and may determine a displacement amount for each vertex of the micropolygon based on the displacement values retrieved from the displacement map.

One or more displacement units or programmable shaders 1040 may receive the micropolygon and an associated normal and displacement value for each vertex and displace each vertex of the micropolygon in the direction of the normal for the vertex by an amount based on the displacement value for the vertex.

If the displaced micropolygon is in a position that maps into screen space and overlaps more than one adjacent specified screen space region, then the displacement unit 1040 may return the displaced micropolygon to the render unit 1010 to be sub-divided into two or more new micropolygons so that each one of the sub-divided new micropolygons maps onto only one of the adjacent specified screen space regions. In some embodiments, a specified screen space region may correspond to one or more pixels.

The displacement unit 1040 may tag the displaced micropolygon before returning the displaced micropolygon to the render unit 1010 so that the sub-divided new micropolygons may not be displaced a second time.

Sample generators 1060 may receive the displaced micropolygons and generate corresponding sets of sample values to be stored in a sample memory 1070.

In some embodiments, the system may include two or more pipelines, with each pipeline including one or more: render units, displacement units, texture units, and texture memories. The number of each unit in each pipeline may be determined by the desired throughput and the average complexity of each task performed.

The system may also include a host computer configured to process graphic objects into geometric primitives and include one or more: sample convolution units to generate pixel values, video output units, and displays.

Figure 18:
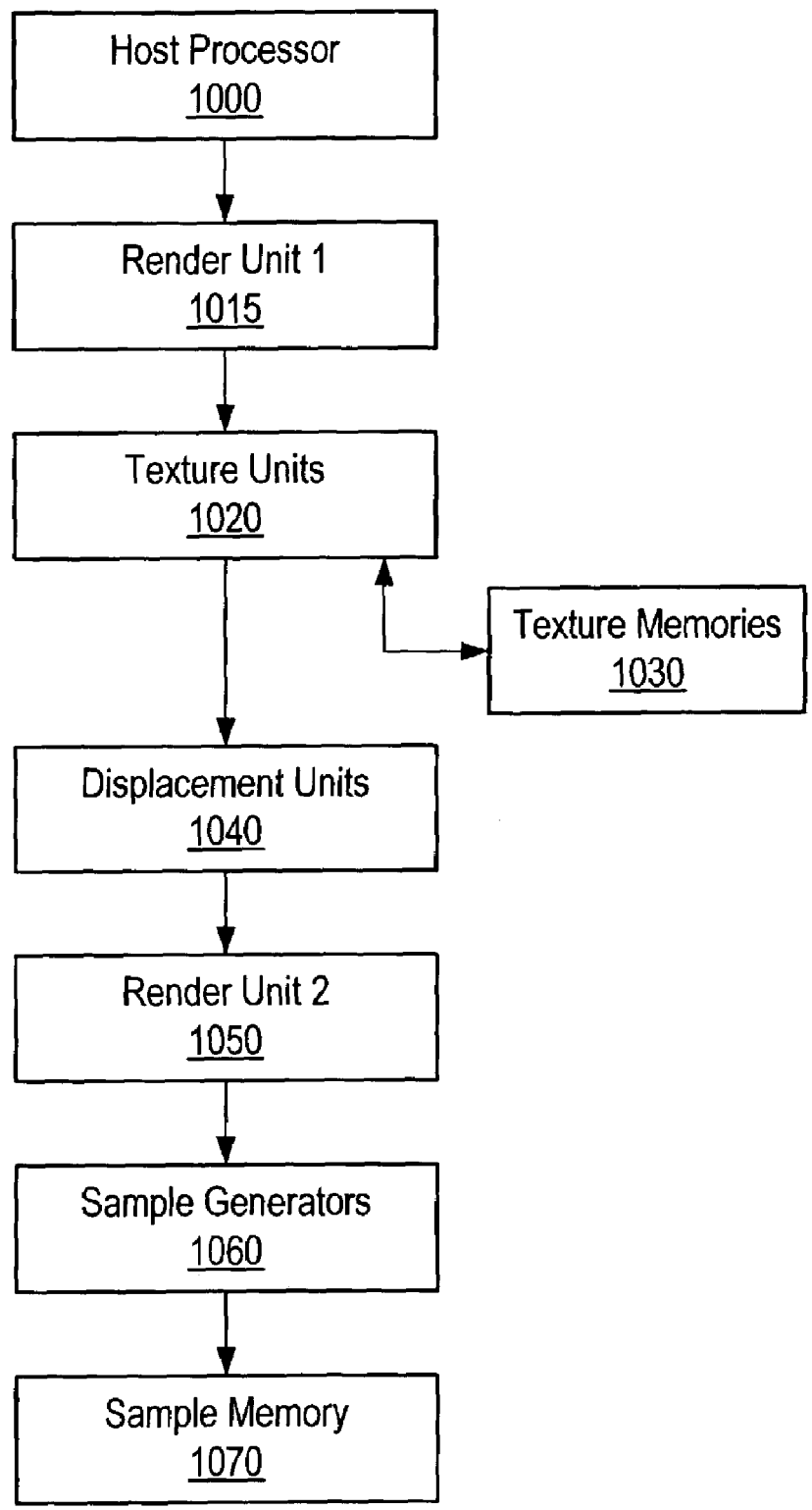
FIG. 18 illustrates another set of embodiments of a system for displacement mapping.

FIG. 18 illustrates another set of embodiments for a graphics system with a processing pipeline that may be capable of real time displacement mapping of micropolygons. In these embodiments, a first set of render units 1015 may sub-divide and/or tessellate geometric primitives into micropolygons and interpolate a normal for each new vertex created. A second set of render units 1050 may sub-divide those displaced micropolygons that map into screen space and overlap more than one adjacent specified screen space region. Each one of the sub-divided new micropolygons may then map onto only one of the adjacent specified screen space regions.

In one set of embodiments, the system utilizes an edge contract to tessellate a graphics primitive. The render unit (or a processor) 1010 may be operable to receive parameter values for two vertices defining an edge of a polygon, where the parameter values for each of the two vertices comprise a normal, texture coordinates, and derivatives of vertex coordinates as a function of texture coordinates; and where each parameter value is determined specifically for the corresponding vertex. The render unit 1010 may select one of the two vertices defining the edge as a first vertex, where the selection is independent of the order the two vertices are received, and where the selection is independent of the polygon containing the edge. The render unit 1010 may select one or more partitioning points along the edge from the first vertex; and interpolate parameter values for each of the partitioning points based on the location of the partitioning point and the parameter values and locations of the two vertices, where the interpolation algorithms are independent of the one or more polygons containing the edge. The texture unit (or texture data access unit) 1020 may determine a texture value for each partitioning point by interpolation of texture values stored in a memory 1030. A programmable processor (or programmable shader) may execute a program stored in a memory to operate on vertex parameter values based on texture values provided by the texture data access unit. In some of these embodiments, the programmable processor (or programmable shader) may be a displacement unit 1040 that may displace each of the new vertexes (also referred to as partitioning points) in an n-dimensional space based on the corresponding texture values, wherein n is greater than or equal to three.

Various of the above embodiments have been described in terms of performing displacement mapping on tessellated geometry. However, it is noted that the inventive principles described herein apply to displacement shaders in general and not only to the special case of displacement mapping.

Numerous variations and modifications will become apparent to those skilled in the art once the above disclosure is fully appreciated. It is intended that the following claims be interpreted to embrace all such variations and modifications.

What is claimed is:

1. A method comprising:
   tessellating a polygon in camera space into a set of micropolygons so that each micropolygon maps to a region of screen space that does not cross boundaries of specified screen space regions;

displacing each vertex of each micropolygon by a corresponding displacement amount in the direction of a normal at the vertex to form a set of displaced micropolygons, wherein the displacement amount for each vertex location of each micropolygon is based on a specified set of displacement values; and sub-dividing each displaced micropolygon into two or more new micropolygons, if boundaries projected from the specified screen space regions intersect the displaced micropolygon generating an image for display on a display device, wherein one or more pixels of said image are at least partially determined using the displaced micropolygons or the new micropolygons.

2. The method of claim 1, wherein each specified screen space region is a region of screen space corresponding to a pixel.

3. The method of claim 1, further comprising interpolating parameter values for each new vertex of the two or more sub-divided micropolygons.

4. The method of claim 3, further comprising outputting displaced micropolygons to a sample generation pipeline.

5. The method of claim 1, wherein displacement of micropolygons is at a rate to support a real time video data stream.

6. The method of claim 1, wherein the specified set of displacement values is a displacement map stored in a memory.

7. The method of claim 6, wherein a displacement map value selected for a vertex is the displacement map value at a map location that is closest to the map coordinates corresponding to the vertex location.

8. The method of claim 6, wherein the displacement map value selected for a vertex is interpolated from values for multiple map locations surrounding the map location corresponding to the vertex location.

9. The method of claim 8, wherein the displacement amount equals the selected displacement map value times a specified scalar value.

10. A method comprising:
determining a displacement amount for each vertex location of a micropolygon based on a specified set of displacement values;
displacing each vertex of the micropolygon by the corresponding displacement amount in the direction of a normal specified for the vertex; and
sub-dividing the displaced micropolygon into two or more new micropolygons, if boundaries projected from specified screen space regions, intersect the displaced micropolygon generating an image for display on a display device, wherein one or more pixels of said image are at least partially determined using the displaced micropolygon or the new micropolygons.

11. The method of claim 10, further comprising tessellating a geometric primitive in a three dimensional coordinate space according to boundaries projected from designated screen space regions to create the micropolygons.

12. The method of claim 11, further comprising interpolating parameter values for each new vertex of a micropolygon based on the parameter values corresponding to the vertexes of the geometric primitive.

13. The method of claim 10, wherein each specified screen space region is a region of screen space corresponding to a pixel.

14. The method of claim 10, further comprising interpolating parameter values for each new vertex of the new micropolygons.

15. The method of claim 14, further comprising outputting displaced micropolygons to a sample generation pipeline.

16. The method of claim 10, wherein displacement of micropolygons is at a rate to support a real time video data stream.

17. A graphics system pipeline comprising:
a means for sub-dividing geometric primitives into micropolygons;
a means for displacing each micropolygon to a position based on a displacement map; and
a means for sub-dividing each displaced micropolygon into two or more new micropolygons if portions of the displaced micropolygon correspond to more than one pixel region in render pixel space, wherein each of the new micropolygons correspond to a different pixel region.

18. A graphics system pipeline comprising:
one or more render units. operable to sub-divide geometric primitives into micropolygons; and
one or more displacement units operable to receive micropolygons from the render unit and displace each micropolygon to a position based on a value determined from a displacement map, and if the displaced micropolygon has moved to a position that corresponds to more than one specified screen space region, return the micropolygon to the render unit for sub-division into two or more new micropolygons, wherein each of the new micropolygons correspond to a different screen space region.

19. The system of claim 18, further comprising one or more memories for storing displacement maps.

20. The system of claim 19, further comprising one or more texture units for retrieving displacement values from a displacement map stored in one or more of the memories.

21. The system of claim 18, further comprising one or more additional pipelines, wherein each pipeline comprises one or more rasterizers and one or more displacement units.

22. The system of claim 18, wherein each specified screen space region corresponds to a pixel region in screen space.

23. The system of claim 18, wherein each of said two or more new micropolygons corresponds to a different pixel region in screen space, and wherein the different pixel regions are adjacent pixel regions.

24. The system of claim 18, further comprising a host computer operable to process graphic objects into geometric primitives.

25. The system of claim 18, further comprising means for processing micropolygons to generate pixel values, and means for displaying the pixel values.

26. A graphics pipeline comprising:
one or more programmable shaders configured to receive micropolygons and displace each micropolygon to a position defined by a displacement map, wherein each micropolygon corresponds to a specified screen space region; and
one or more rasterizers configured to sub-divide each displaced micropolygon into two or more new micropolygons, if the displaced micropolygon is in a position that corresponds to more than one specified screen space region, wherein each of the new primitives correspond to a different specified screen space region.

27. The system of claim 26, further comprising a second set of one or more rasterizers configured to sub-divide geometric primitives into smaller micropolygons and outputting the smaller micropolygons to the programmable shaders, wherein each smaller micropolygon corresponds to a specified screen space region.

28. The system of claim 26, further comprising one or more memories for storing displacement maps.

29. The system of claim 28, further comprising one or more texture units for retrieving displacement values from a displacement map stored in one of the memories.

30. The system of claim 26, further comprising one or more additional pipelines, wherein each pipeline comprises one or more rasterizers and one or more programmable shaders.

31. The system of claim 26, further comprising a host computer configured to process graphic objects into geometric primitives.

32. The system of claim 31, further comprising means for processing displaced micropolygons to generate pixel values, and means for displaying the pixel values.

33. The system of claim 26, wherein each specified screen space region corresponds to a pixel region in screen space.

34. A method comprising:
tessellating a polygon in camera space into micropolygons by boundaries projected from a screen pixel grid onto the polygon, wherein each micropolygon maps to a region of screen space that does not cross pixel boundaries;

displacing a position of each vertex of each micropolygon by a corresponding displacement amount to create corresponding displaced micropolygons, wherein the displacement amount for each vertex position is based on a specified set of displacement values; and sub-dividing each displaced micropolygon into two or more new micropolygons, if the displaced micropolygon maps to a region of screen space that does cross screen pixel boundaries, wherein each of the new micropolygons maps to a region of screen space that does not cross screen pixel boundaries generating an image for display on a display device, wherein one or more pixels of said image are at least partially determined using the displaced micropolygons or the new micropolygons.

35. The method of claim 1, wherein each new micropolygon maps to a region of screen space that does not cross boundaries of the specified screen space regions.

* * * * *

UNITED STATES PATENT AND TRADEMARK OFFICE
CERTIFICATE OF CORRECTION

PATENT NO. : 7,148,890 B2  Page 1 of 1
APPLICATION NO. : 10/405906
DATED : December 12, 2006
INVENTOR(S) : Rice et al.

It is certified that error appears in the above-identified patent and that said Letters Patent is hereby corrected as shown below:

Column 18 Line 15, please delete "render pixel space, whercin each" and substitute -- render pixel space, wherein each --.

Signed and Sealed this

Sixth Day of March, 2007

JON W. DUDAS
*Director of the United States Patent and Trademark Office*